United States Patent [19]

Funada et al.

[11] Patent Number: 5,257,119
[45] Date of Patent: Oct. 26, 1993

[54] IMAGE PROCESSING APPARATUS WHICH ADDS APPARATUS IDENTIFICATION DATA TO IMAGES

[75] Inventors: Masahiro Funada, Yokohama; Toshiyuki Kitamura; Mitsuhiro Yamamoto, both of Kawasaki; Eiji Ohta, Fujisawa, all of Japan

[73] Assignee: Canon Kabushiki Kaisha, Tokyo, Japan

[21] Appl. No.: 856,996

[22] Filed: Mar. 24, 1992

[30] Foreign Application Priority Data

| Mar. 25, 1991 | [JP] | Japan | 3-060248 |
| May 8, 1991 | [JP] | Japan | 3-102354 |
| May 29, 1991 | [JP] | Japan | 3-124345 |
| Jul. 1, 1991 | [JP] | Japan | 3-160560 |

[51] Int. Cl.$^5$ ........................ H04N 1/32; H04N 1/44
[52] U.S. Cl. .................... 358/438; 358/440; 358/450; 283/901
[58] Field of Search ............. 358/440, 438, 434, 450; 355/201; 283/17, 901, 902; 382/34; 380/57

[56] References Cited

U.S. PATENT DOCUMENTS

| 4,472,050 | 9/1984 | Stockburger et al. | |
| 4,504,084 | 3/1985 | Jauch | 283/17 |
| 4,588,286 | 5/1986 | Stockburger et al. | |
| 4,739,377 | 4/1988 | Allen | |
| 4,870,506 | 9/1989 | Miura | 358/440 |
| 4,908,873 | 3/1990 | Philibert | 283/902 |
| 5,047,864 | 9/1991 | Fujito | 358/450 |

FOREIGN PATENT DOCUMENTS

| 382549 | 8/1990 | |
| 3410774 | 4/1985 | Fed. Rep. of Germany |
| 2494000 | 5/1982 | France |

Primary Examiner—Edward L. Coles, Sr.
Assistant Examiner—Scott A. Rogers
Attorney, Agent, or Firm—Fitzpatrick, Cella, Harper & Scinto

[57] ABSTRACT

An image processing apparatus previously stores information on particular kinds of image, determines the degree of similarity between an input full-color image signal and the information on particular kinds of image, controls conditions for addition of a particular pattern previously stored according to a result of the determination, and outputs an image by adding or not adding the particular pattern to the full-color image signal according to the addition conditions.

24 Claims, 30 Drawing Sheets

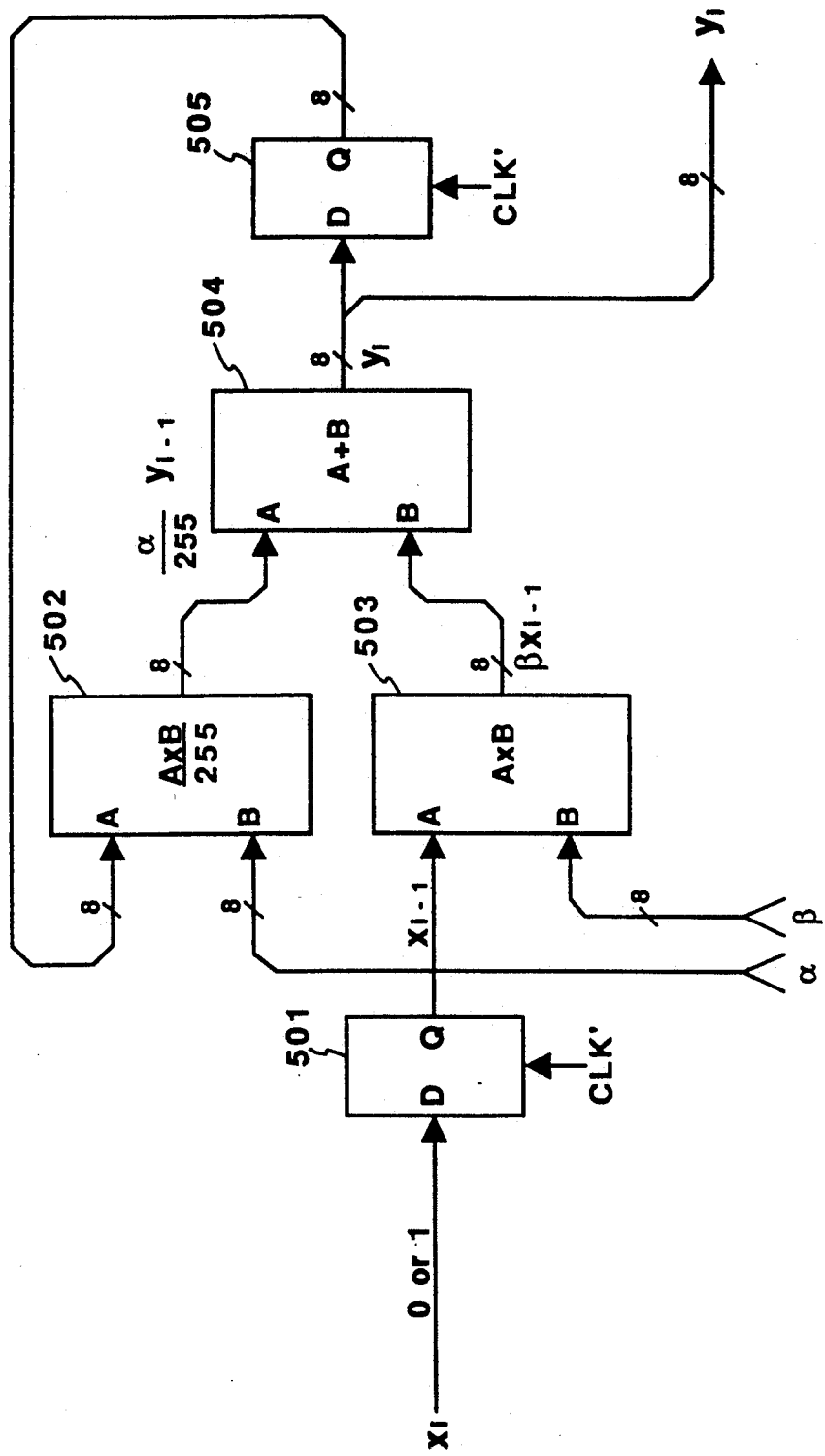
F I G. 5

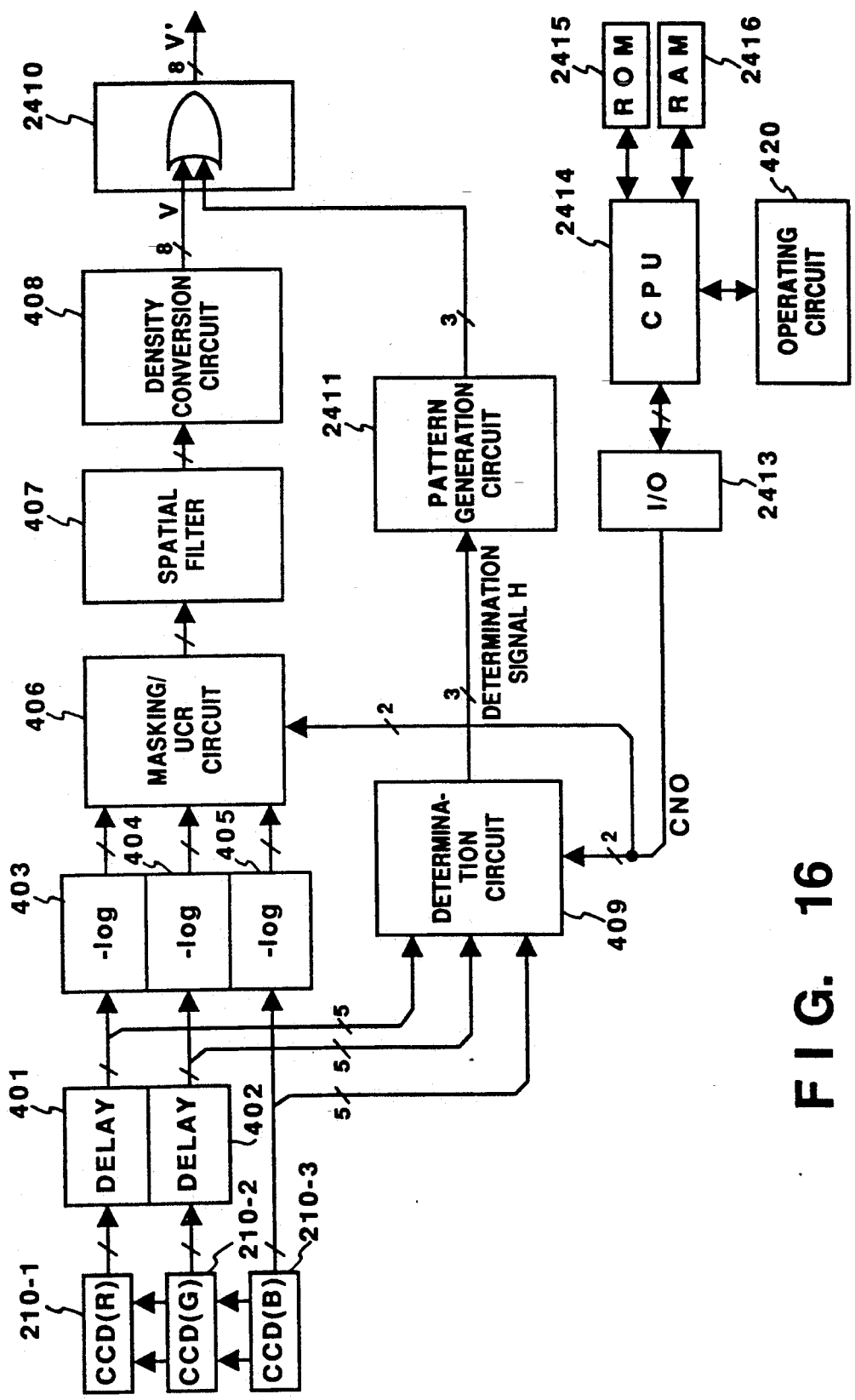
F I G. 16

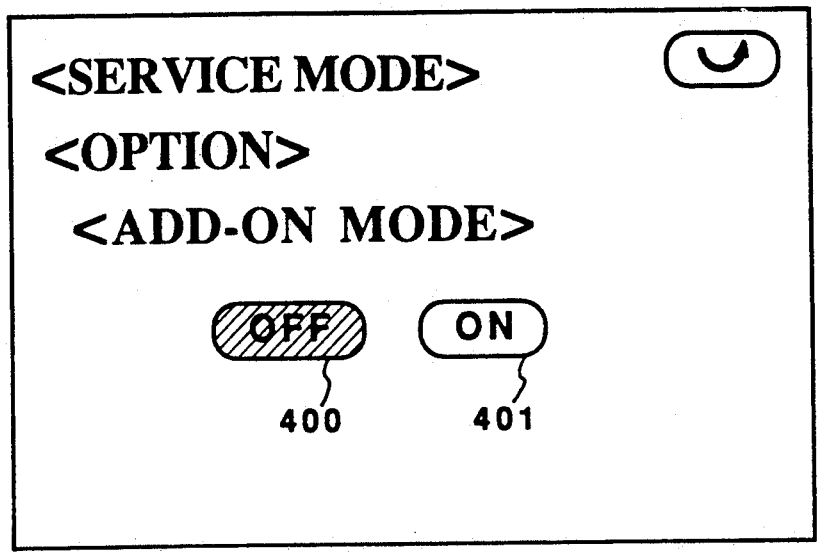
F I G. 21
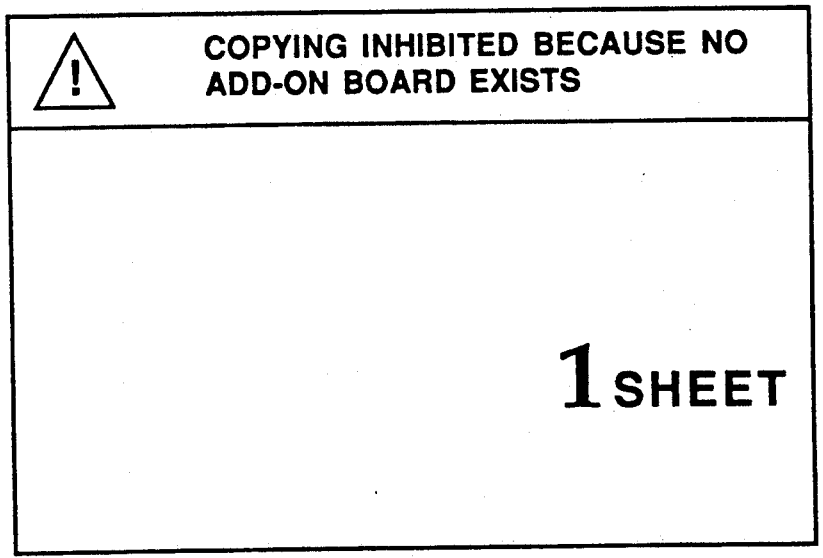
F I G. 22

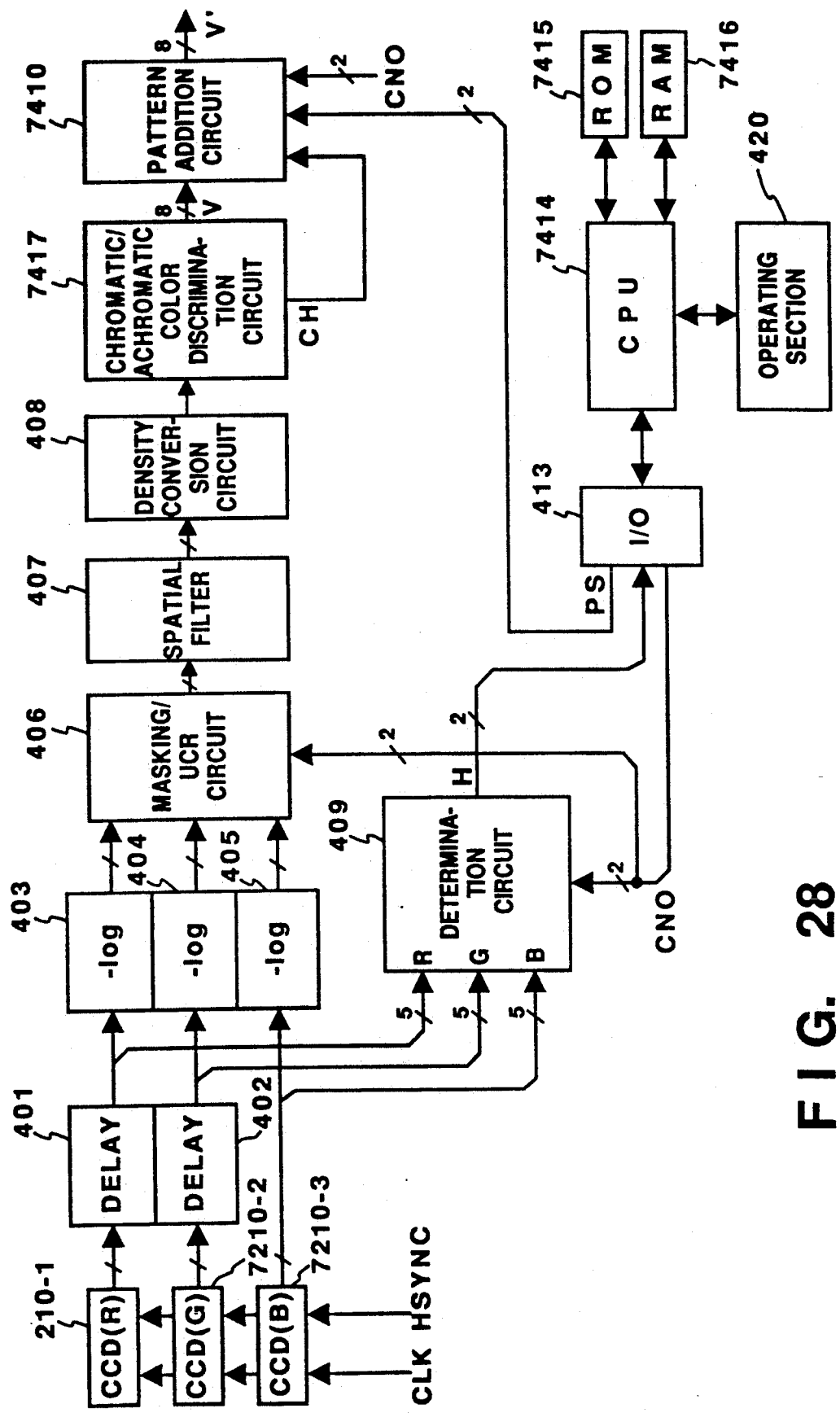
F I G. 28

| SIGNAL CNO | PRINTING OUTPUT |
|---|---|
| 0 | MAGENTA (M) |
| 1 | CYAN (C) |
| 2 | YELLOW (Y) |
| 3 | BLACK (BK) |

IMAGE PROCESSING APPARATUS WHICH ADDS APPARATUS IDENTIFICATION DATA TO IMAGES

BACKGROUND OF THE INVENTION

This invention relates to an image processing apparatus and, more particularly, to an image processing apparatus having a function of adding a particular pattern to a reproduced image.

Copying machines capable of obtaining a multi-color copy having high image qualities have been developed. With such copying machines, a particular kind of original which should not be copied (e.g., a bill or a bank note) can be copied with high image qualities such that the copy can hardly be discriminated from the original. There is a risk of such copying machines being abused.

For this reason, various methods for enabling a copying machine to recognize particular kinds of original have been proposed.

However, no method has been provided which enables identification of a copying machine or a person who has made a copy, after the copying machine has been used to copy a particular kind of original which should not be copied, and after the obtained copy has been put to a bad use.

SUMMARY OF THE INVENTION

An object of the present invention is to provide an image processing apparatus free from the above-described problems.

Another object of the present invention is to provide an image processing apparatus capable of identifying, from a reproduced image, an image processing apparatus which has been used to reproduce the image or a person who has operated the processor.

Still another object of the present invention is to provide an image processing apparatus which has a function of adding a particular pattern to a reproduced image and which is capable of suitably maintaining the quality of the reproduced image.

To achieve these objects, according to one aspect of the present invention, there is provided an apparatus for processing an image comprising determination means for determining the degree of similarity between an input image and a predetermined image, and processing means for processing the input original image data according to a result of determination made by the determination means.

According to another aspect of the present invention, there is provided an apparatus for processing an image comprising generation means for generating pattern data, confirmation means for confirming the state of the generation means, and determination means for determining execution/non-execution of the image processing based on a confirmation result obtained by the confirmation means.

According to still another aspect of the present invention, there is provided an apparatus for processing an image comprising input means for inputting image data, composition means for combining a predetermined pattern with the image data input by the input means, output means for outputting the image data obtained by the composition means, and control means for selecting execution/non-execution of the operation of the composition means according the input image data and/or an output mode of the output means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a block diagram of the construction of an integrator 306 of the first embodiment;

FIG. 14A is a diagram of a displaying state of a liquid crystal touch panel 1203 of the second embodiment when a power source is turned on;

FIG. 16 is a block diagram of an image scanner unit in accordance with a third embodiment of the present invention;

FIG. 21 is a diagram of the operation in an add-on mode in accordance with the fifth embodiment;

FIG. 22 is another diagram of the operation in the add-on mode in accordance with the fifth embodiment;

FIG. 28 is a block diagram of the construction of an image scanner unit in accordance with a seventh embodiment of the present invention;

DESCRIPTION OF THE PREFERRED EMBODIMENTS

Preferred embodiments of the present invention will be described below in detail with reference to the accompanying drawings.

Copying machines will be described as embodiments of the present invention, but, needless to say, the present invention is not limited to them and can be applied to any other kind of apparatus.

First Embodiment

Figure 2:
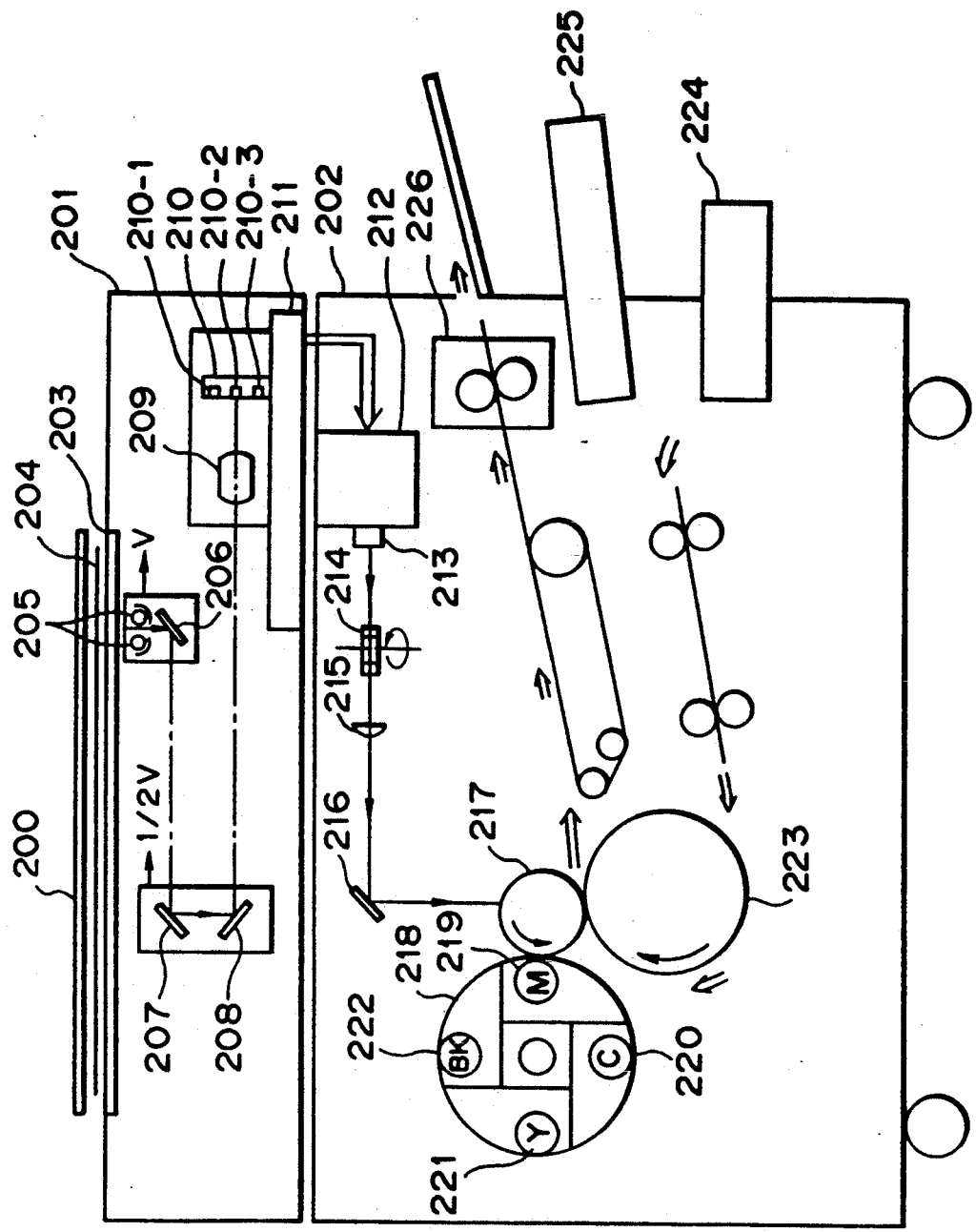
FIG. 2 is a sectional side view of the construction of a copying machine in accordance with the first embodiment of the present invention.

FIG. 2 is a sectional side view showing the construction of a copying machine in accordance with the first embodiment of the present invention. An image scanner unit 201 reads an original at a resolution of 400 dpi (dots/inch) and to process a digital signal representing the original. A printer unit 202 prints a full-color output image corresponding to the original image read by the image scanner 201 on a print sheet at a resolution of 400 dpi.

In the image scanner unit 201, an original 204 is placed on an original table glass (hereinafter referred to as a platen) 203 while being pressed by a specular pressing plate 200. The original 204 is irradiated with a lamp 205, and reflection light from the original travels via mirrors 206, 297, and 208. An image is formed from this light on a three-line sensor (hereinafter referred to as a CCD) 210 by a lens 209. Full-color information having a red components R, a green component G and a blue component B is thereby obtained and is sent to a signal processing section 211. The lamp 205 and mirrors 206 to 208 are mechanically moved in a direction perpendicular to the direction of electrical scanning of the line sensor (a main scanning direction) to scan the surface of the original (in a sub scanning direction). For this scanning, the lamp 205 and the mirror 206 are moved at a speed v and the mirrors 207 and 208 are moved at a speed of ½ v.

In the signal processing section 211, the read image signal is electrically processed to be decomposed into a magenta component M, a cyan component C, a yellow component Y, and a black component BK to be sent to the printer unit 202. In one cycle of original scanning of the image scanner 201, one of the components M, C, Y, and BK is sent to the printer 202. One print of the reproduced image is completed by four cycles of original scanning.

Each image signal M, C, Y or BK sent from the image scanner unit 201 is sent to a laser driver 212. The laser driver 212 drives a semiconductor laser 213 by modulating the driving signal. A surface of a sensitive drum 217 is scanned with light from the laser led by a polygon mirror 214, an f-$\theta$ lens 215 and a mirror 216.

A rotary development device 218 has a magenta development section 219, a cyan development section 220, a yellow development section 221 and a black development section 222. These development sections are alternately brought into contact with the sensitive drum 217 to develop, with a toner, an electrostatic image formed on the sensitive drum.

A paper sheet supplied from a paper cassette 224 or 225 is wrapped around a transfer drum 223, and the image developed on the sensitive drum is transferred to the paper sheet.

After four colors M, C, Y and BK have been successively transferred in this manner, the print sheet is passed through a fixation section 226 and is discharged after the completion of fixation of the toner.

Figure 1:
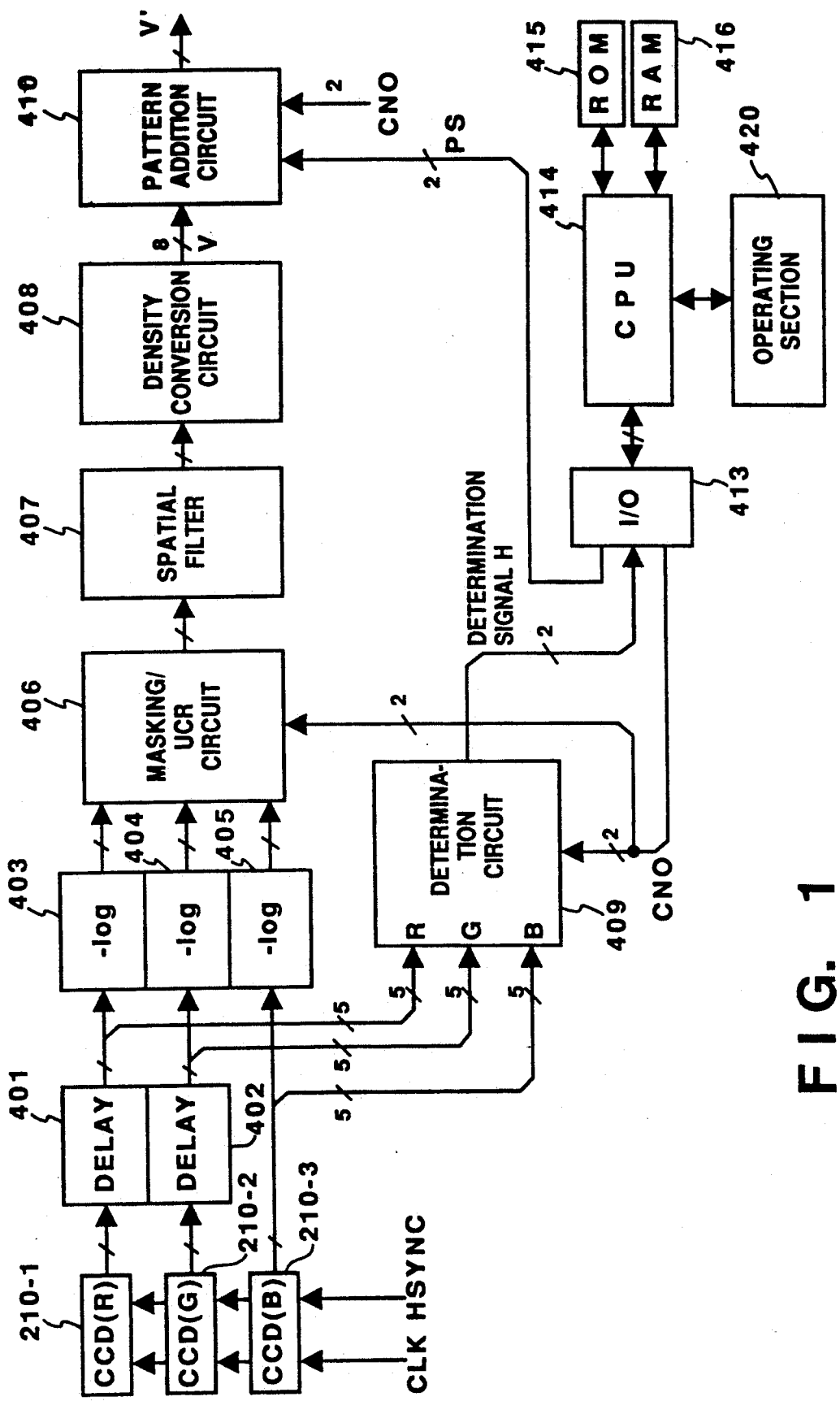
FIG. 1 is a block diagram of the construction of an image scanner 201 in accordance with a first embodiment of the present invention.

FIG. 1 is a block diagram of the construction of the image scanner unit 201 in accordance with the first embodiment. Blocks 210-1, 210-2, and 210-3 represent CCD sensors (solid image pick-up elements) having spectroscopic sensitivity characteristics such as to be sensitive to red (R), green (G) and blue (B), respectively. Each sensor converts an analog input into an 8-bit signal having a value of 0 to 255 and outputs this signal.

The sensors 210-1, 210-2, and 210-3 used in accordance with the first embodiment are disposed at certain distances, and relative spatial deviations thereof are corrected by delay elements 401 and 402. Blocks 403, 404, and 405 represent logarithmic converters which are constituted of look-up table ROMs or RAMs and which convert a luminance signal into a density signal. A block 406 represents a masking UCR (under color removal) circuit in which each time a magenta signal M, a cyan signal C, a yellow signal Y or a black signal BK to be output is read from three input signals, it is output as a signal having a predetermined bit length, e.g., of 8 bits formed in a surface-sequential manner.

A block 407 represents a spatial filter circuit which corrects spatial frequencies of an output signal. A block 408 represents a density converter circuit which compensates density characteristics of the printer unit 202. The density converter circuit 408 is constituted of ROMs or RAMs similar to those of the logarithmic converters 403 to 405.

A block 414 represents a microcomputer (hereinafter referred to as a CPU) for overall control of this unit. A block 415 represents a ROM in which a program for operating the CPU 414 is stored. A block 416 represents a RAM which is used as a work area for executing various programs. A block 413 represents an input/output (I/O) port which is connected to the CPU 414. A block 409 represents a determination circuit which discriminates particular kinds of original.

The circuit 409 for discriminating particular kinds of originals determines a probability that at least one of predetermined particular kinds of original is being read, and outputs the determination results as multi-value data i.e., two-bit determination signal H. The value of the determination signal H is selected so that the probability is higher if the value of the determination signal H is greater. That is, H="3" is output when the probability is highest and H="0" is output when the probability is lowest. The determination circuit 409 also has a function of thinning out input signals R, G, and B by a thinning-out circuit 301 and a frequency divider circuit 310 described later with reference to FIG. 3.

Figures 30, 31:
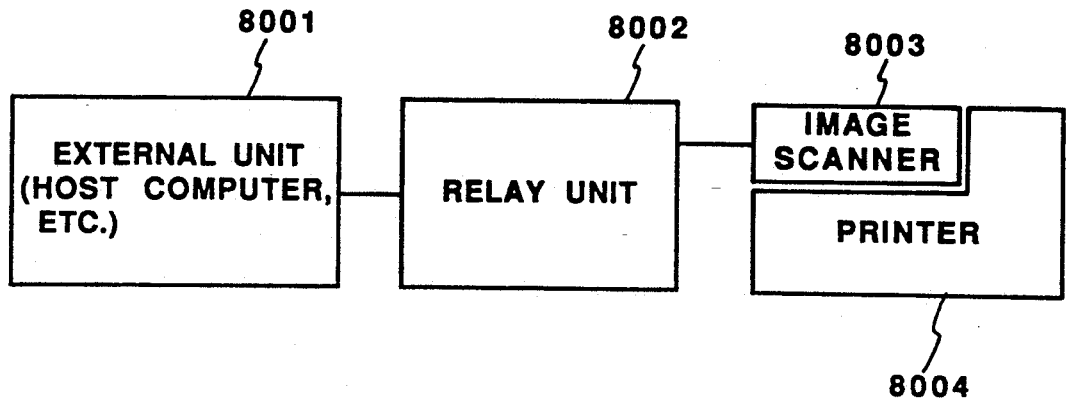
FIG. 30 is a diagram of the construction of an information processing system in accordance with an eighth embodiment of the present invention.
FIG. 31 is a diagram of the relationship between a signal CNO and a print output.

A signal CNO is a two-bit screen-sequential signal which indicates the order of the four reading operations with respect to four output colors, magenta (M), cyan (C), yellow (Y) and black (BK). FIG. 31 shows the relationship between the signal CNO and the printing output. The signal CNO is generated by the CPU 414 and supplied through the I/O port 413 to change conditions of the operation of the masking UCR circuit 406. That is, the signal CNO is changed from 0 to 1, 2, and 3, the output color of a print is correspondingly changed from magenta, to cyan, yellow, and black.

The signal CNO is also input to the determination circuit 409 to change the determination criteria with respect to the four reading operations, so that the determination circuit 409 can effect determination with respect to different particular kinds of original.

A block 410 represents a pattern addition circuit in which a pattern which cannot easily be discriminated with human eyes is added to a reproduced image, i.e., a copied image according to a two-bit pattern level selection signal PS designated by the CPU 414.

A block 420 represents an operating section which has various operation keys and a display panel on which messages are displayed.

Figure 4A:
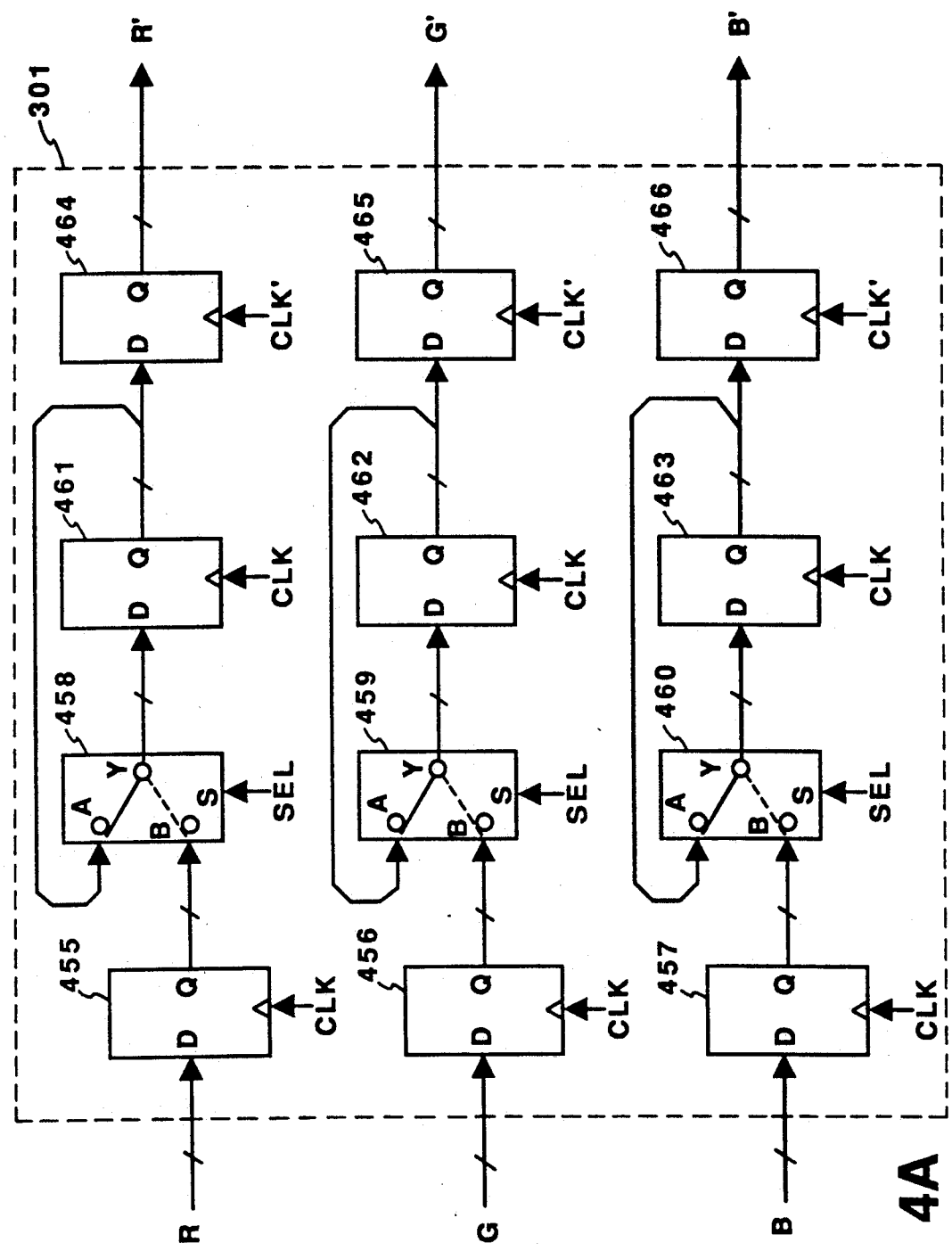
FIG. 4A is a block diagram of the construction of a thinning-out circuit 301 of the first embodiment.
Figure 4B:
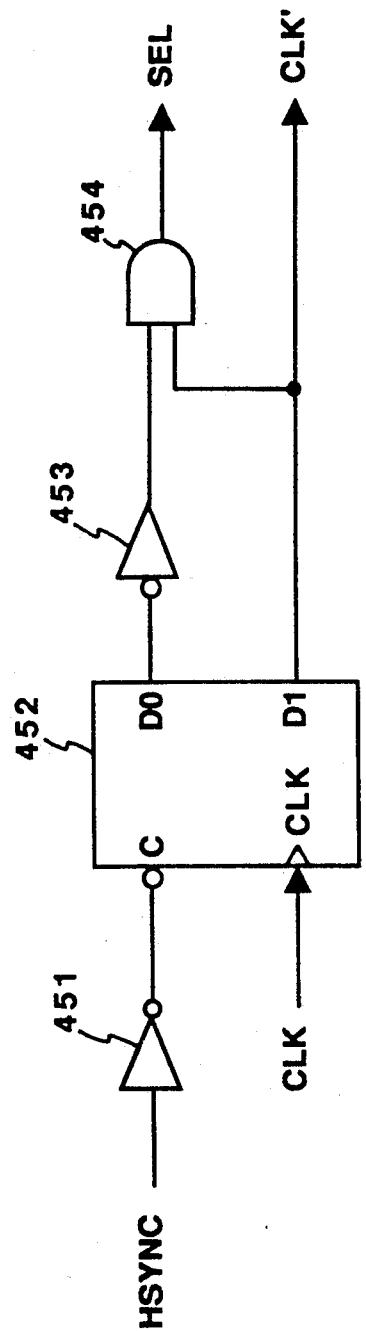
FIG. 4B is a block diagram of the construction of a frequency divider circuit 310 of the first embodiment.
Figure 6:
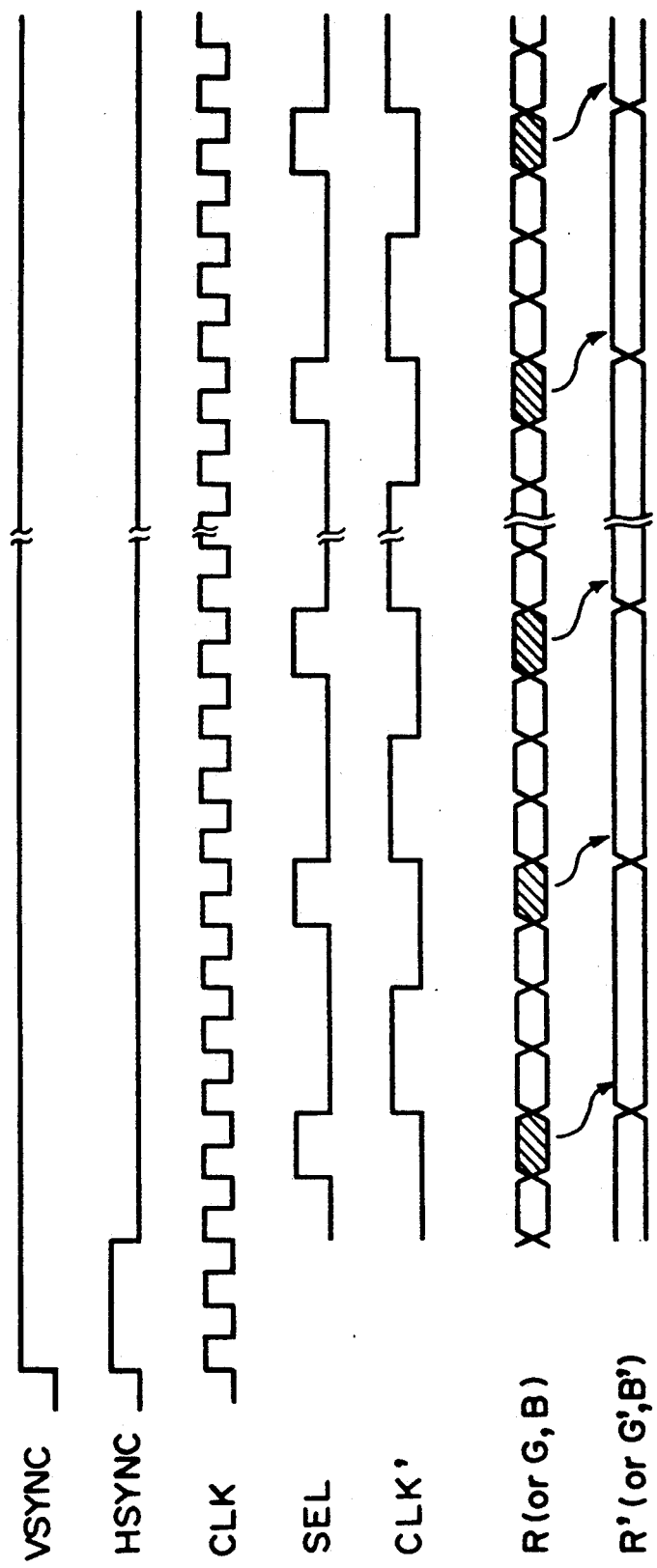
FIG. 6 is a diagram of timing of a signal in the main scanning direction in accordance with the first embodiment.

FIG. 4A is a block diagram of the construction of the frequency divider circuit 310 in accordance with the first embodiment of the present invention, and FIG. 4B is a block diagram of the construction of the frequency divider circuit 310 in accordance with the first embodiment. FIG. 6 is a diagram of timing of various signals with respect to the main scanning direction in accordance with the first embodiment.

A signal VSYNC shown in FIG. 6 is a sub scanning period signal which indicates an image output period of sub scanning. A signal HSYNC is a main scanning sync signal for synchronization of the start of main scanning. A clock CLK represents an image transfer clock which is fundamental clock for various kinds of image processing in the first embodiment.

A clock CLK' represents a clock which is obtained by demultiplying the frequency of the CLK to be used as a fundamental clock for the determination circuit 409. A signal SEL is a timing signal for use in the thinning-out circuit 301 described below. The CLK' and SEL are generated by the frequency divider circuit 310 described below.

The thinning-out circuit 301 and the frequency divider circuit 310 will now be described below.

In FIG. 4A, blocks 455 to 457, and 461 to 466 represent flip flops, and blocks 458 to 460 represent selectors. In FIG. 4B, blocks 451 and 453 represent inverters, a block 452 represents a two-bit counter, and a block 454 represents and AND gate.

The flip flops 455, 456, 457, 461, 462, and 463, and the selectors 458, 459, and 460 hold data by the timing of CLK while the flip flops 464, 465, and 466 hold data by the timing of CLK'.

In the frequency divider circuit 310, the inverter 451 and the two-bit counter 452 are cleared (initialized) with the signal HSYNC which is the main scanning sync signal, and the CLK is thereafter counted to output two-bit count values (D0, D1). The upper bit D1 of these count values is output as CLK', and a logical product of the upper bit D1 and an inverted signal of the lower bit D0 is output as signal SEL.

Consequently, in the thinning-out circuit 301, the signal R (G, or B) transferred by CLK is thinned out at a rate of ¼ and is synchronized with CLK' to obtain a signal R' (G', or B'), as shown in FIG. 6.

Figure 3:
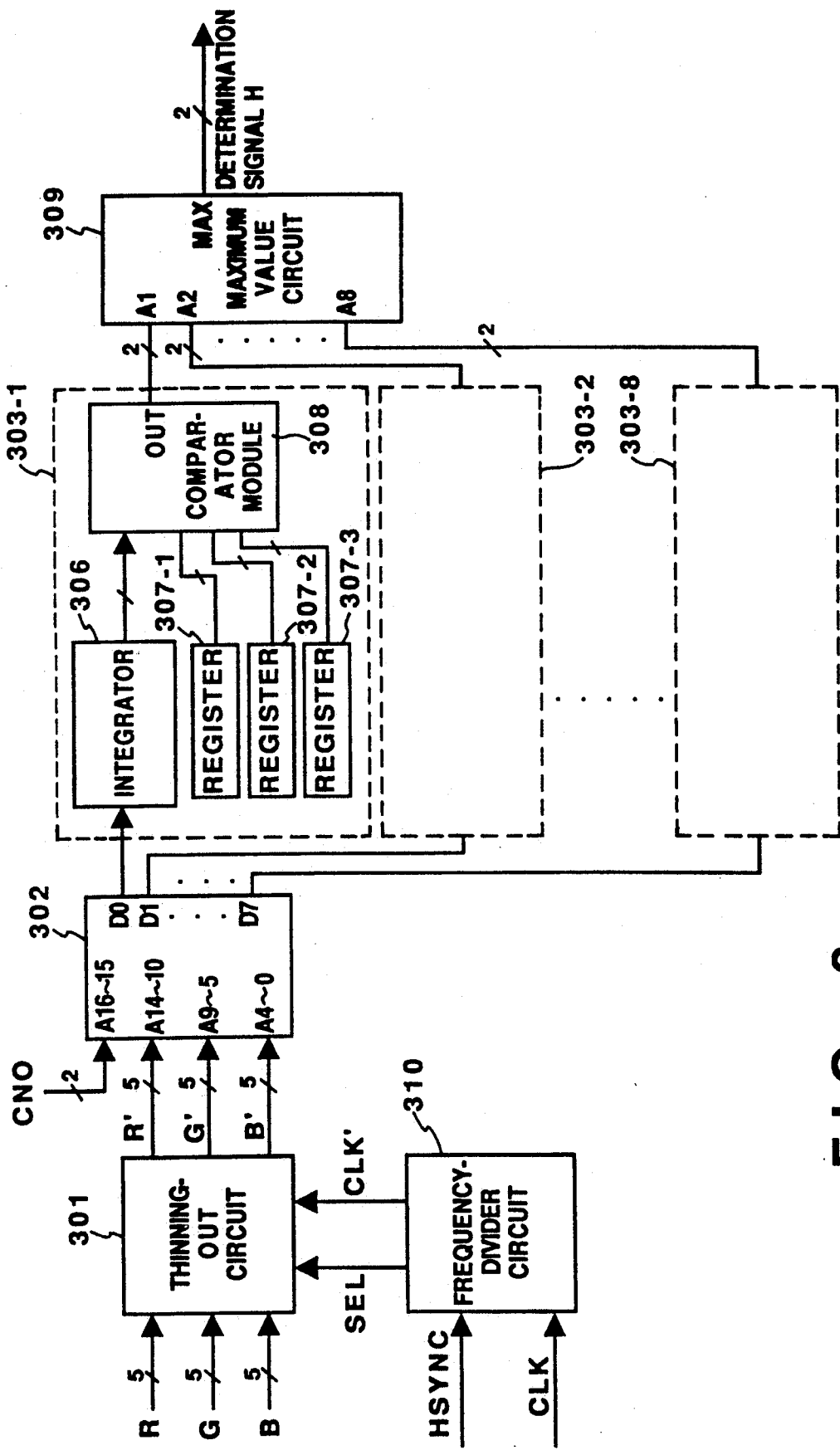
FIG. 3 is a block diagram of the construction of a determination circuit 409 of the first embodiment.

FIG. 3 is a block diagram of the construction of the determination circuit 409 in accordance with the first embodiment. The thinning-out circuit 301 also shown in FIG. 4A thins out data to reduce the load on the processing section of the determination circuit 409. A block 302 represents a color tone matching look-up table ROM (hereinafter referred to as "LUT") which serves to examine color tone matching between an original read by the copying machine and a plurality of particular kinds of original (securities, bank notes, confidential papers and the like). The LUT 302 is stored information representing results of determination based on examination of color tone distributions of 32 particular kinds of original, i.e., bit information representing matching with a color tone of each particular kind of original and bit information representing mismatching with a color tone of each particular kind of original. 32 particular kinds of original are all combinations of each of 8 particular kinds of original with M, C, Y, and BK.

That is, the signal CNO which is a screen-sequential signal is input to upper 2 bits of each address in the LUT 302 and upper 5 bits of the thinned-out image signal of each of colors R, G, and B are input to lower 15 bits of the address. Determination results according to signal CNO values 0 to 3 as to whether the color tone of each pixel indicated by the upper 5 bit image signal coincides with one of 8 tones of the particular kinds of original with respect to each color are simultaneously output in correspondence with the 8-bit data. Consequently, determination is made with respect to the 32 particular kinds of original by four cycles of read scanning for M, C, T, and BK.

Blocks 303-1, 303-2, ..., 303-8 shown in FIG. 3 represent color tone determination circuit constituted of the same hardware, i.e., each constituted of an integrator 306, registers 307 and a comparator module 308. Each of the color tone determination circuits 303-1, 303-2, ..., 303-8 determines a probability of the existence of the corresponding particular kind of original in the read original and outputs a two-bit determination result. A block 309 represents a maximum value circuit which outputs the maximum of the determination results output from the color tone determination circuits 303-1, 303-2, ..., 303-8. The maximum value circuit 309 outputs a determination result corresponding to one of the 8 particular kinds of original which is most probable to exist.

Figure 7A:
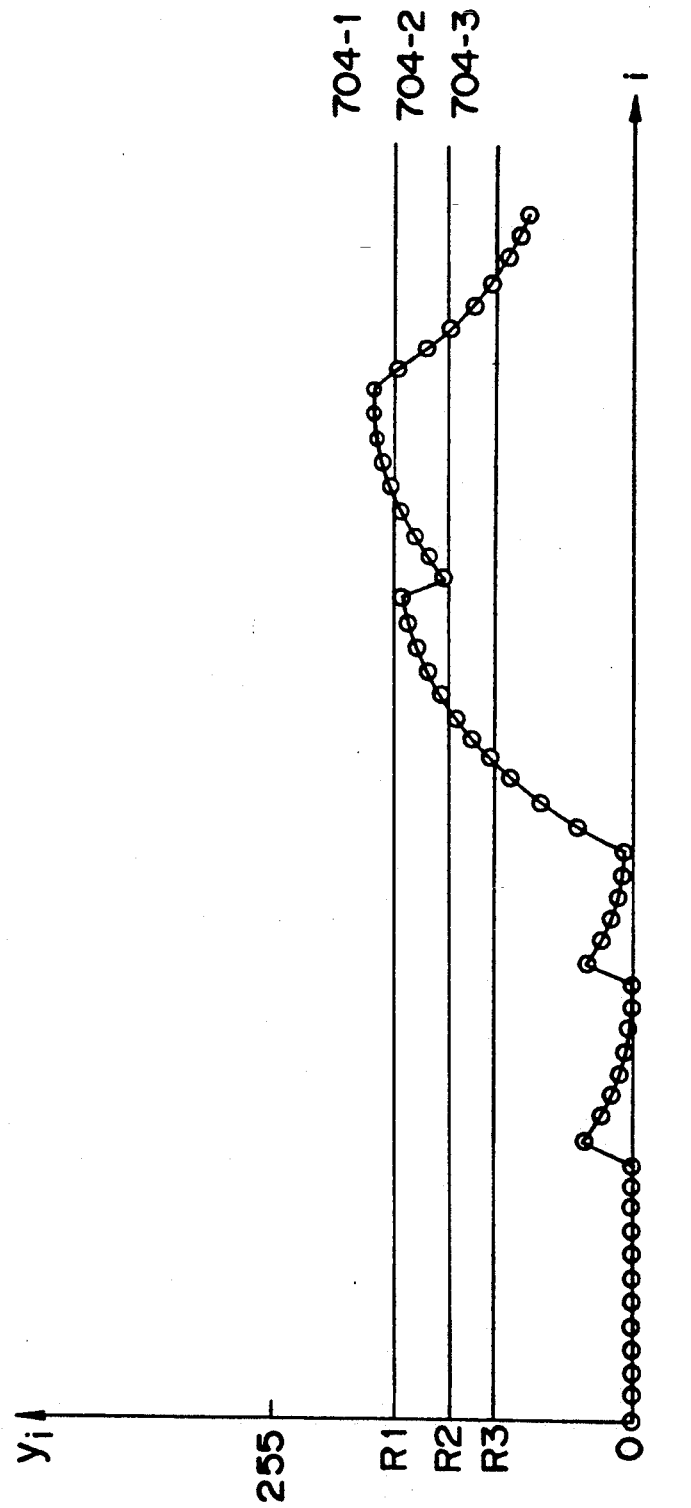
FIGS. 7A and 7B are diagrams of examples of input/output of the integrator 306 of the first embodiment.
Figure 7B:
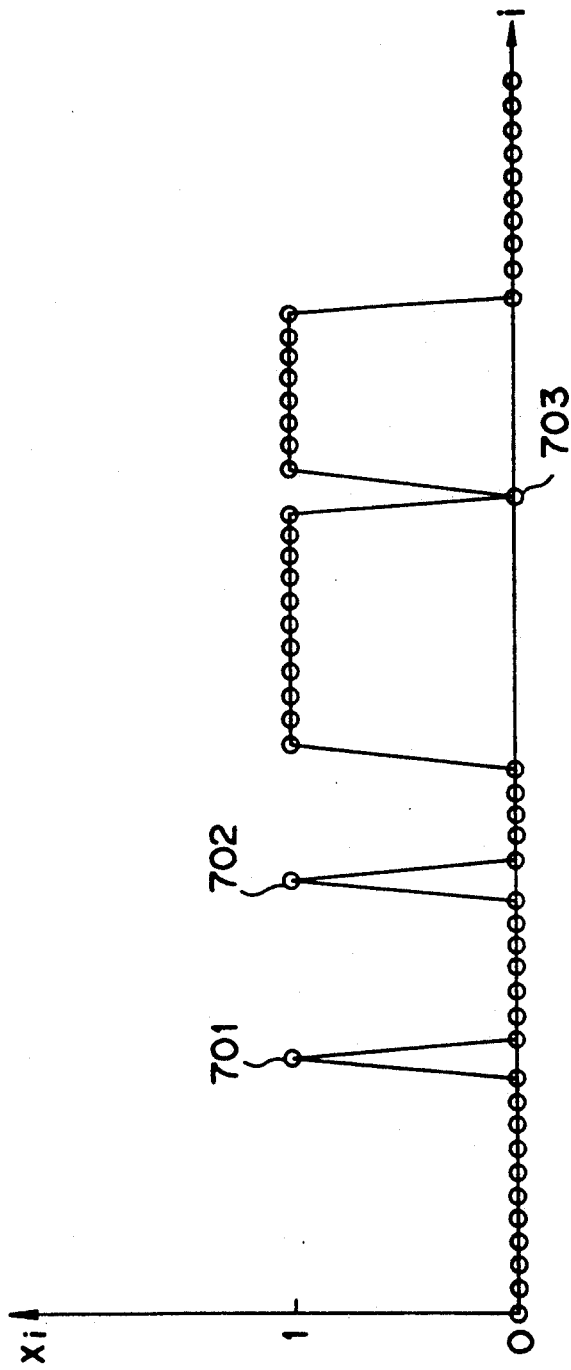

FIG. 5 is a block diagram of the construction of the integrator 306 in accordance with the first embodiment, FIG. 7A is a diagram of an example of an output from the integrator 306, and FIG. 7B is a diagram of an example of an input to the integrator 306.

Blocks 501 and 505 shown in FIG. 5 represent flip flops which hold data by the timing of each rise of CLK'. A block 502 represents a multiplier which is supplied with two 8-bit input signals (A, B) and which outputs an 8-bit signal (A×B/255). A block 503 represents a multiplier which is supplied with a 1-bit input signal (A) and an 8-bit input signal (B) and multiplies these signals to output an 8-bit output signal (A×B). A block 504 represents an adder which is supplied with two 8-bit input signals (A, B) and outputs an 8-bit signal (A+B) as an addition result.

Consequently, in the operation of the integrator 306, an 8-bit signal yi with respect to a binary input signal xi is expressed by the following equation:

$$y_i = (\alpha/255) \cdot y_{i-1} + \beta \cdot x_{i-1} \qquad (1)$$

Values α and β in this equation are predetermined constants, and various characteristics of the integrator 306 are determined by these values.

For example, when α=247 and β=8, an output yi shown in FIG. 7A is output with respect to an input xi shown in FIG. 7B.

An input component, such as that indicated by a point 701 or 702, having a level "1" among other input components having level "0", or an input component, such as that indicated by a point 703, having a level "0" among other components having a level "1" can be regarded as noise. The input signal having such components is processed by the integrator while setting suitable threshold values such as values 704-1 (R1), 704-2 (R2), and 704-2 (R2) in the registers shown in FIG. 3. The output yi from the integrator 306 is thereby two-valued to remove noise.

Figure 8:
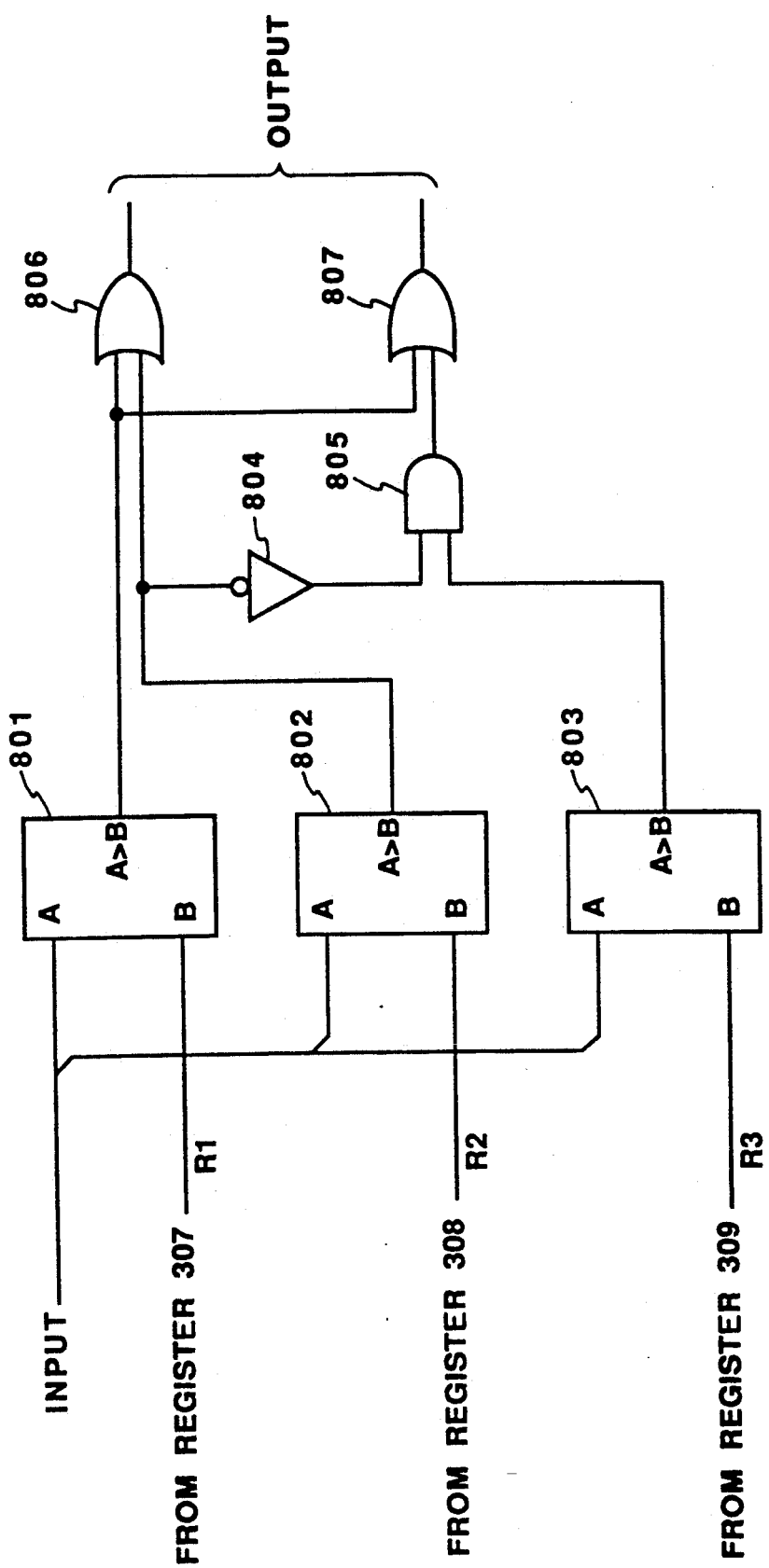
FIG. 8 is a block diagram of the construction of a comparator module 310 of the first embodiment.

FIG. 8 is a block diagram of the construction of the comparator module 308 in accordance with the first embodiment. In FIG. 8, blocks 801, 802, and 803 represent comparators, a block 804 represents an inverter, a block 805 represents an AND gate, and blocks 806 and 807 represent OR gates. Threshold values R1, R2, and R3 mentioned above with reference to FIG. 7A are previously set in the registers 307-1, 307-2, and 307-3, respectively. A relationship R1>R2>R3 is established. From the comparator module 308, the determination result is output by being quantized into 2 bits. That is, OUTPUT=11 (binary) is output if R1<(input),
OUTPUT=10 (binary) is output if R2<(input)≦R1,
OUTPUT=01 (binary) is output if R3<(input)≦R2, and
OUTPUT=00 (binary) is output if (input)≦R3.

Figure 9:
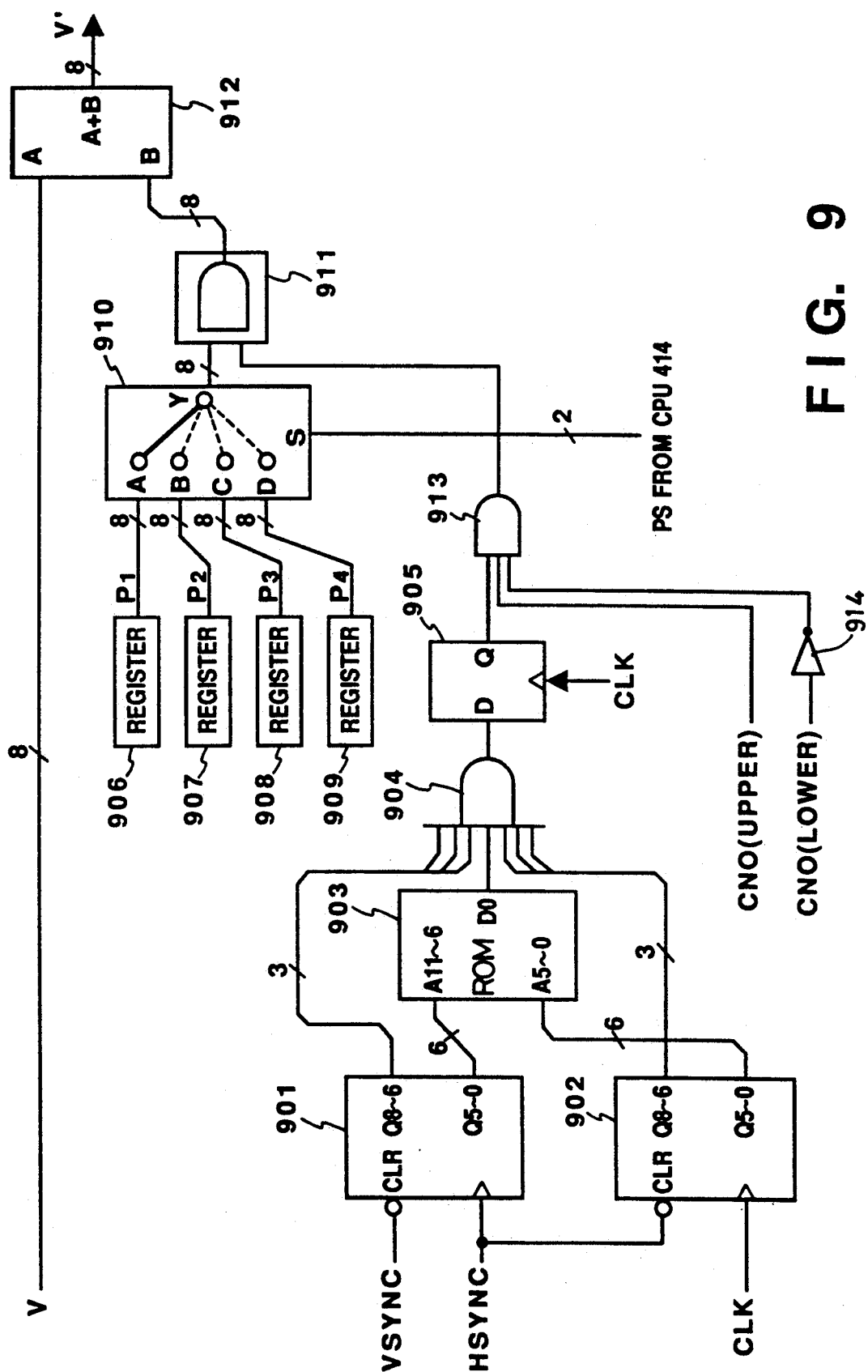
FIG. 9 is a block diagram of the construction of a pattern addition circuit 410 of the first embodiment.

FIG. 9 is a block diagram of the construction of the pattern addition circuit 410 in accordance with the first embodiment. In FIG. 9, a block 901 represents a sub scanning counter, a block 902 represents a main scanning counter, a block 903 represents a LUT, a block 905 represents a flip flop, a block 913 represents an AND gate, blocks 906, 907, 908, and 905 represent registers, a block 910 represents 4 to 1 selector, a block 911 represents an AND gate, a block 912 represents an adder, and a block 914 represents an inverter.

The sub scanning counter 901 counts the main scanning sync signal HSYNC while the main scanning counter 902 counts the pixel sync CLK. Each counter repeatingly counts the signal in a cycle of a 9 bit width, i.e., 512 pixels. The LUT 903 is a read only memory in which a pattern to be added is stored, and which is supplied with lower 6 bits of the count value from each of the sub scanning counter 901 and the main scanning counter 902. Only one bit of the output from LUT 903 is referred to and is combined with upper 3 bits of each of the main scanning counter 901 and the sub scanning counter 902 by the AND gate 904 to obtain a logical product of these bits. This logical product is synchronized with CLK by the flip flop 905 and is combined with both lower and upper bits of CNO which is the two-bit screen-sequential signal to obtain a logical product which is supplied to the AND gate 911. This signal supplied to the AND gate 911 is effective only when CNO=2 (lower bit: 0, upper bit: 1), that is, only when printing in yellow is being performed (see FIG. 31).

Values P1, P2, P3, and P4 are previously stored in the registers 906, 907, 908, and 909. The selector 910 selects one of the values P1, P2, P3, and P4 according to the pattern level selection signal PS(based on determination signal H) designated by the CPU 414. The value output from the selector 910, i.e, a pattern signal is supplied through the AND gate 911 and is added to an input signal V by the adder 912. An image signal obtained by the adder 912 is output as a reproduced image signal V'. Thus, when CNO=2, that is, printing in yellow is being performed, the pattern stored in the LUT 903 is repeatedly read out and added to the signal to be output.

In a pattern addition mode, a relationship P1<P2<P3<P4 is established between P1, P2, P3 and P4. In the selector 910, Y=A is set when s=00 (binary),
Y=B is set when s=01 (binary),
Y=C is set when s=10 (binary, and
Y=D is set when s=11 (binary).

Therefore pattern addition is effected so that

V'=V+P1 when PS=00 (binary),
V'=V+P2 when PS=01 (binary),
V'=V+P3 when PS=10 (binary), and
V'=V+P4 when PS=11 (binary).

The added pattern is formed with yellow toner alone so as to be difficult to discriminate with human eyes. This method is intended to utilize the fact that the discriminating power of human eyes is low with respect to a pattern formed with yellow toner. Further, the arrangement is such that the level of the added pattern is variable according to the probability of the existence of a particular kind of original in the input original. It is thereby possible to make the pattern very difficult to discriminate in ordinary copies with human eyes. The pattern is added more distinctly if the probability of the existence of a particular kind of original is increased.

In a pattern addition inhibition mode, "0" is set in all the registers storing P1, P2, P3, and P4 to form the reproduced image signal V' without adding the pattern signal to the image signal V.

Figure 10:
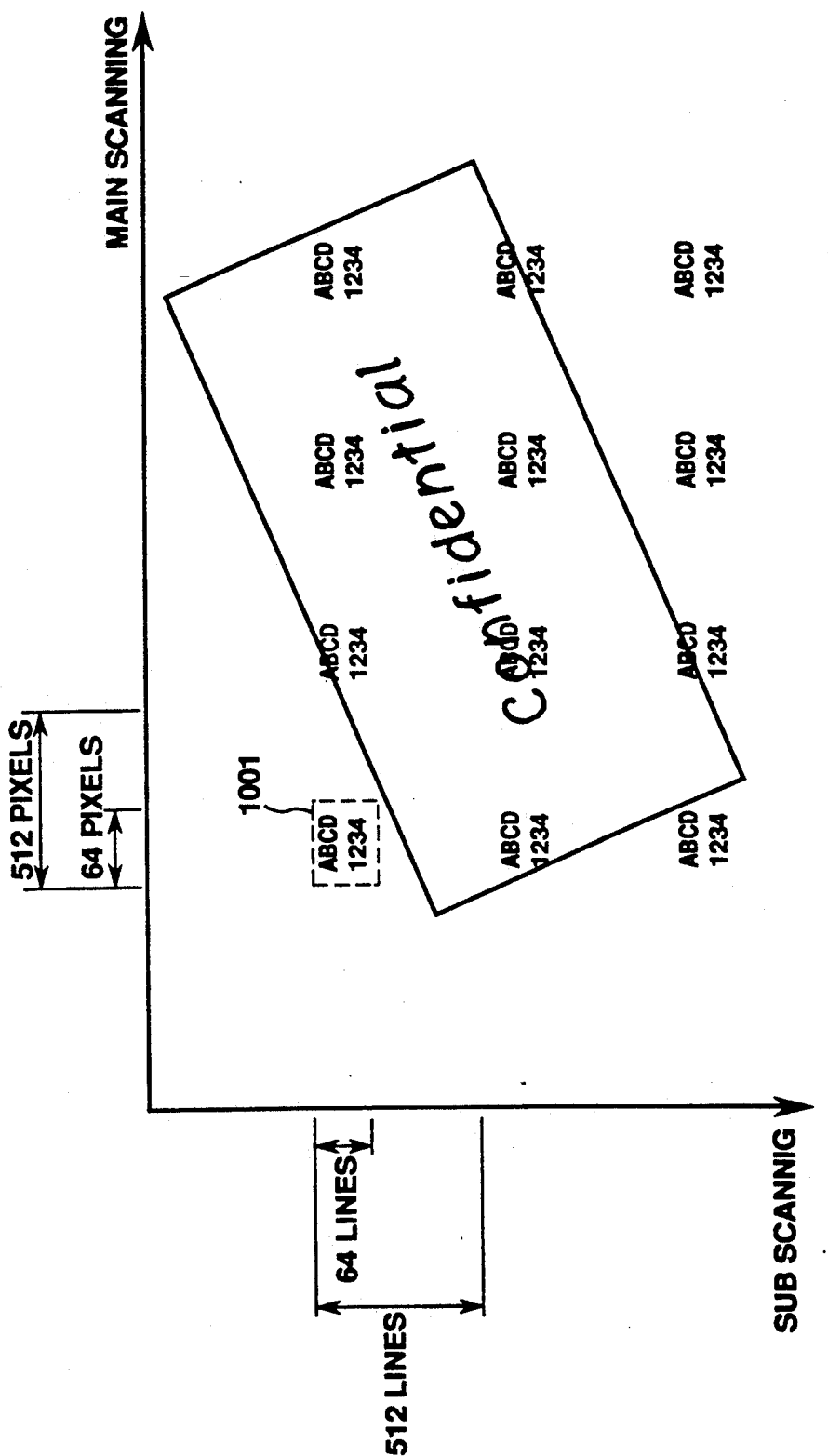
FIG. 10 is an example of copying in accordance with the first embodiment.

FIG. 10 is a diagram showing an example of a result of copying in accordance with the first embodiment. In FIG. 10, an added pattern is indicated at 1001. The content stored in the ROM 903 is added. In the example shown in FIG. 10, the added pattern has two rows of characters "ABCD" and "1234" and is formed as a pattern of 64×64 pixels such as to be difficult to discriminate with human eyes. This pattern is repeatedly formed at intervals of 512 pixels in the main scanning direction and at intervals of 512 lines in the sub scanning direction. As this added pattern, a manufacturer's serial number exclusively assigned to the copying machine or encoded pattern of this number may be formed to enable the machine used to copy a particular kind of original to be identified by examining the copy.

If the probability that a particular kind of original which should not be copied may exist in the read image is high, a more distinguishable pattern may be added.

In the first embodiment, the pitch at which added patterns are arranged correspond to 12 pixels in the main scanning direction, and the patterns are therefore added at intervals of about 32.5 mm since the copying machine in accordance with the first embodiment has a resolution of 400 dpi (dots/inch). A bank note of the Bank of Japan, which is a particular kind of original which should not be copied, has a width of about 76 mm in the direction along its minor side, and the minor-side width of paper moneys of principal countries in the world ranges from about 60 to 120 mm. The pattern can therefore be added always on the face of a copy of any bank note. Even a part of any bank note copy cut out and put to a bad use can be examined to read an added pattern. The model number of the copying machine used to copy the bank note can thereby be known.

Figure 11:
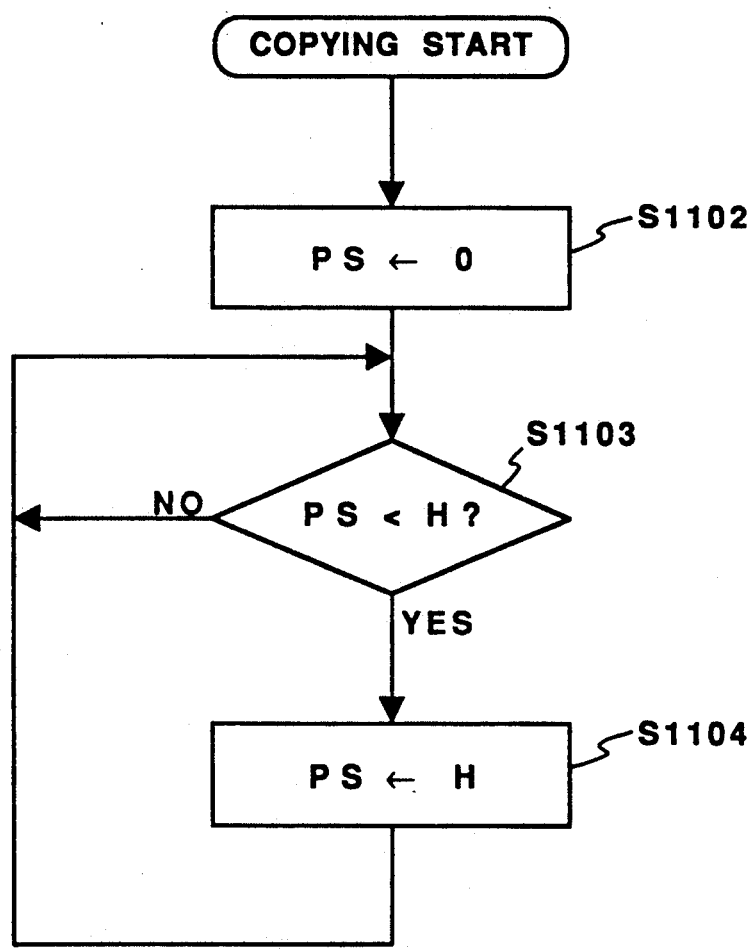
FIG. 11 is a flowchart of a procedure of setting a pattern level selection signal PS in accordance with the first embodiment.

FIG. 11 is a flow chart of the procedure of setting the pattern level selection signal PS in accordance with the first embodiment. Processing in accordance with this procedure is controlled by the CPU 414.

Immediately after the start of copying, in step (S) 1102, "0" is set as the pattern level selection signal PS. Next, in step 1103, the present determination level H and the value of PS are compared. If the level H is higher, the value of H is set as PS in step 1104. If the level H is not higher, the process returns to step 1103. That is, the maximum of the recorded values of the discrimination signal H between the copying start to the present time is set as PS.

As described above, in the first embodiment, a particular pattern which is difficult to discriminate with human eyes is added in accordance with the method of identifying a copying machine, so that the pattern can be used as a key to identifying the copying machine in case where a particular kind of original (e.g., a bank note) which should not be copied is copied. The particular pattern is repeatedly added at a pitch shorter than the width of a bank note in the direction along the minor side thereof, so that the added particular pattern can always be included even in a part of a copy of the bank note which is cut out to be put to a bad use. It is possible to ascertain the copying machine used or the person who has operated the copying machine or to limit suspected machines or persons by examining the added pattern.

Further, the degree of similarity of the read image and the particular pattern previously registered is detected. If the degree of similarity is high, it is determined that the probability of a particular kind of original being copied is high, and the added pattern is intensified so as to be easy to discriminate. If the degree of similarity is low, the pattern is weakened or is not added to avoid a reduction in the image quality of ordinary copies.

The present invention is not limited to the above-described first embodiment. In the first embodiment, the manufacturer's serial number of a copying machine or an encoded pattern of this number is used as a particular pattern to be added. However, any other pattern can be added so long as it has information which serves for identification of the copying machine. For example, it has information such as the machine manufacturing date, the machine lot number, and/or a machine version name for identifying the machine.

In the first embodiment, a copying machine used to copy a particular kind of original is identified. However, the present invention is not limited to this; a person who has copied a particular original may be identified.

A copying machine requiring inserting an identification card for identifying an operator when the machine is used and a machine requiring inputting an identification number are known. Such copying machines may be arranged to add the recognized identification number or an encoded pattern of this number as a particular pattern.

The date of copying or an encoded data on the copying date may also be added as a particular pattern.

An example of a modification of the first embodiment will be described below.

The copying machine of this example has the same overall construction as that of the first embodiment, and only different portions will therefore be described.

Figure 12:
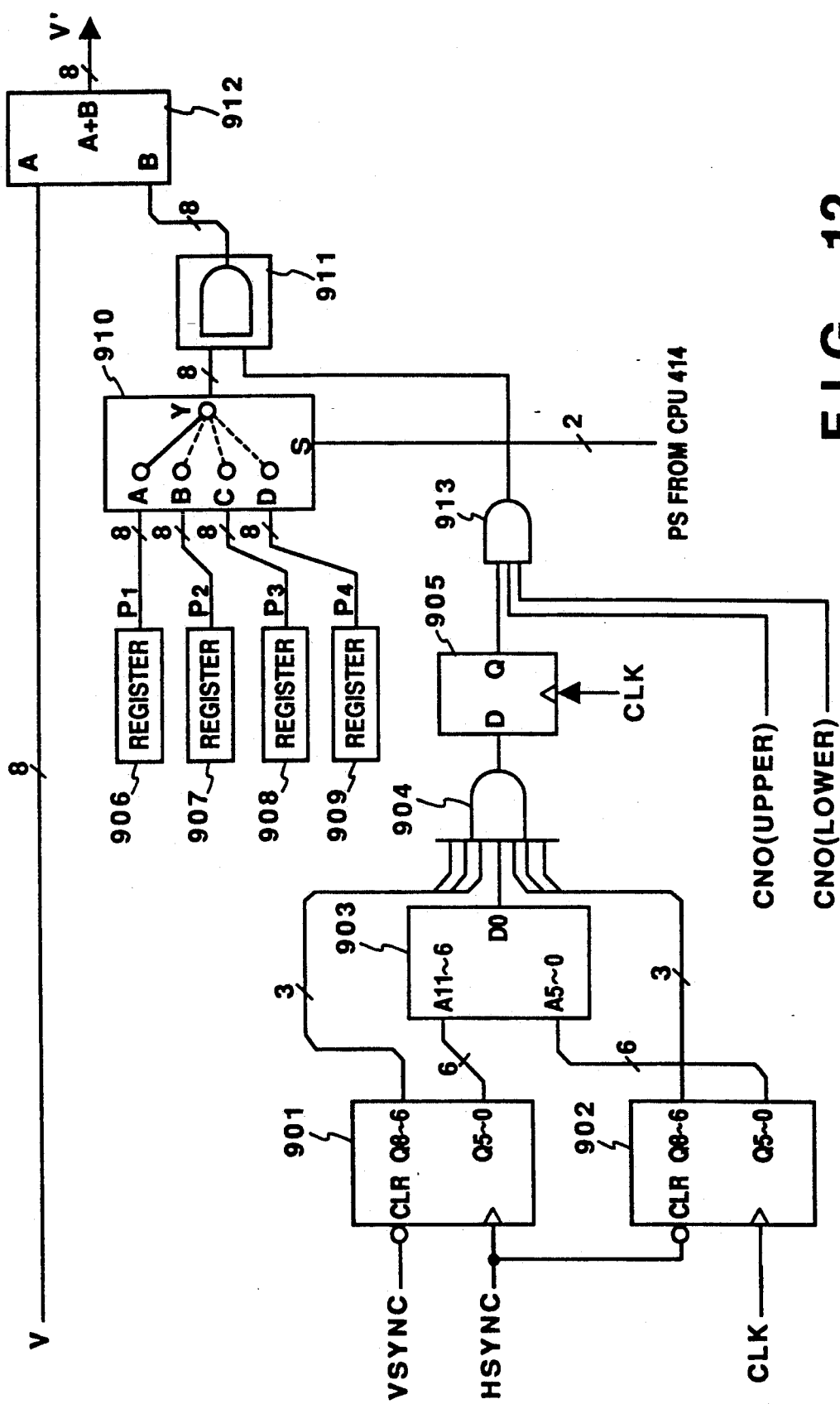
FIG. 12 is a block diagram of the construction of a pattern addition circuit in accordance with an example of a modification of the first embodiment.

FIG. 12 is a block diagram of the construction of a pattern addition circuit in accordance with the modified example of the first embodiment.

In this copying machine, as shown in FIG. 12, the lower bit of the two-bit signal CN0 is directly supplied to AND gate 913 without being supplied through an inverter as in the case of the first embodiment. In this case, the combination of the signal CN0 and an output color of a print may be selected to establish the same relationship as that shown in FIG. 31.

This copying machine also has the same advantages as the first embodiment.

Second Embodiment

The second embodiment of the present invention will now be described below.

This embodiment has features relating to the operating section shown in FIG. 1. This embodiment can also be applied to the arrangement using either one of the pattern addition circuit shown in FIGS. 9 and 12.

Figure 13:
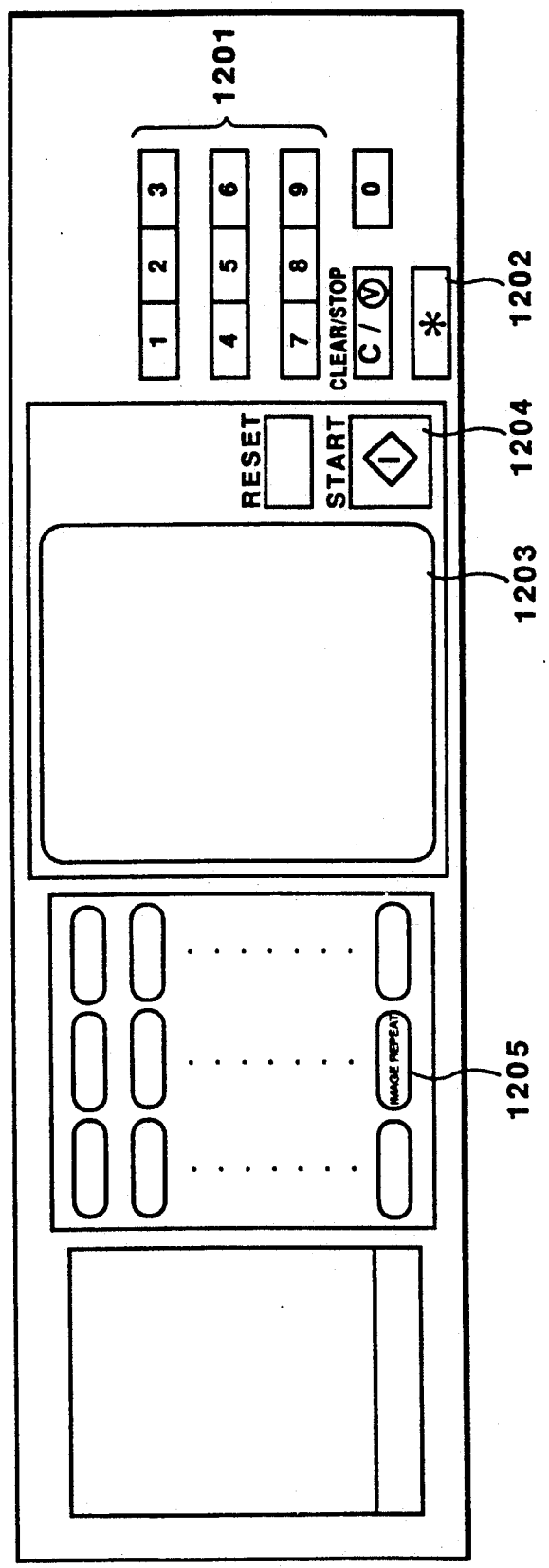
FIG. 13 is a front view of an operating unit in accordance with a second embodiment of the present invention.

FIG. 13 is a front view of the appearance of an operating unit in accordance with the second embodiment. A ten key cluster 1201 is provided which is used to select the number of copies and to select one of various operation modes. An asterisk (*) key 1201 is used in association with the ten key cluster 1201 to select the operation mode. A liquid crystal touch panel 1203 serves as both a display panel and an input panel. A copying start key 1204 is used to start copying. An image repeat key 1205 is used to designate an image repeat function described later.

Figure 14A:
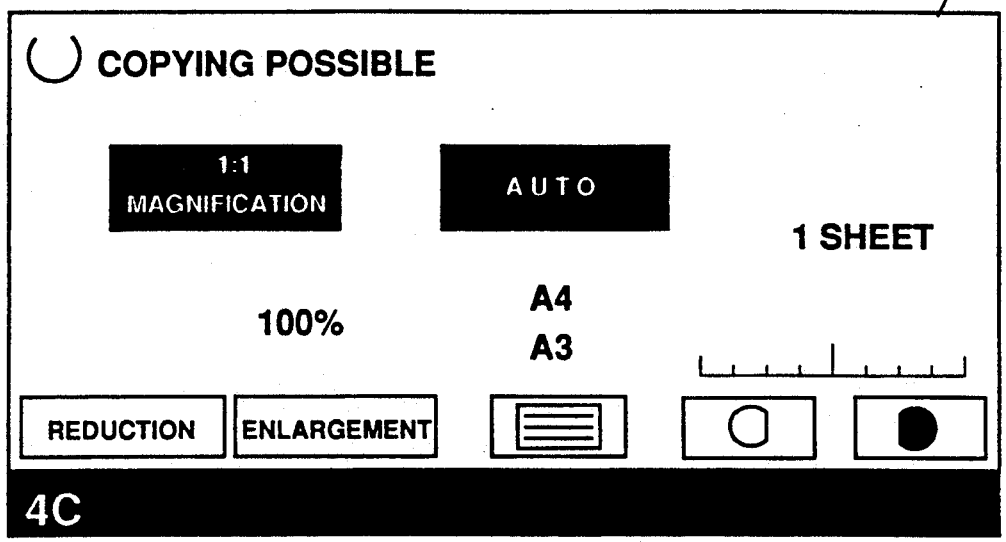

FIG. 14A is a diagram of a displaying state of the liquid crystal touch panel 1203 in accordance with the second embodiment when a power source is turned on. The number of copies is designated with the ten key cluster 1201 and the designated number of copies is displayed on the screen at an upper right position. In FIG. 14A showing the initial display state, the indicated number of copies is 1.

The image repeat function, which is known per se, will be described in detail, and only an outline of it will be given.

Figure 15:
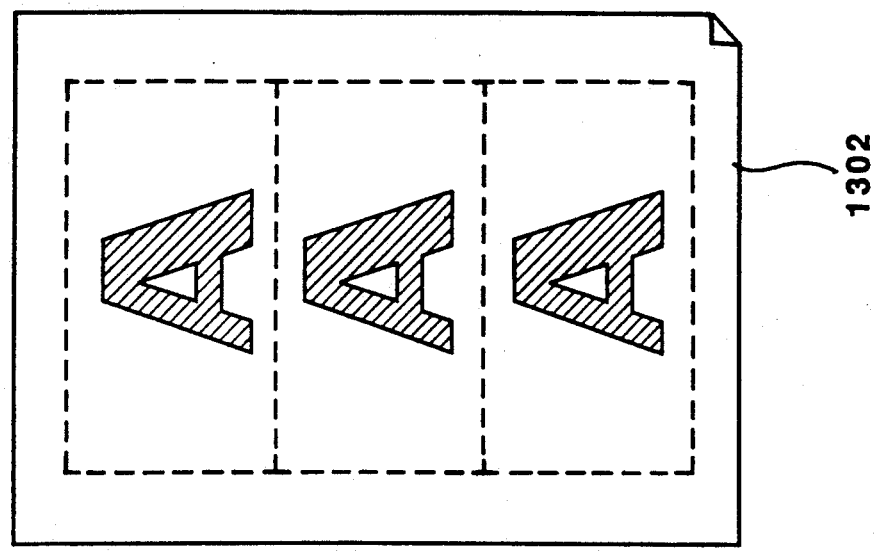
FIG. 15 is a diagram of an example of the image repeat function in accordance with the second embodiment.
Figure 15:
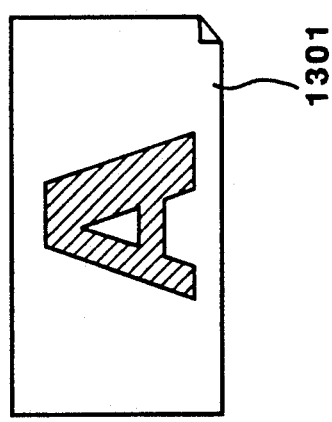

FIG. 15 is a diagram of an example of the image repeat function in accordance with the second embodiment. The image repeat function is designated with respect to an original indicated by 1301 to enable an image, e.g., a character A, read from the original to be repeatedly output onto one output paper sheet such as that indicated by 1302.

Figure 14B:
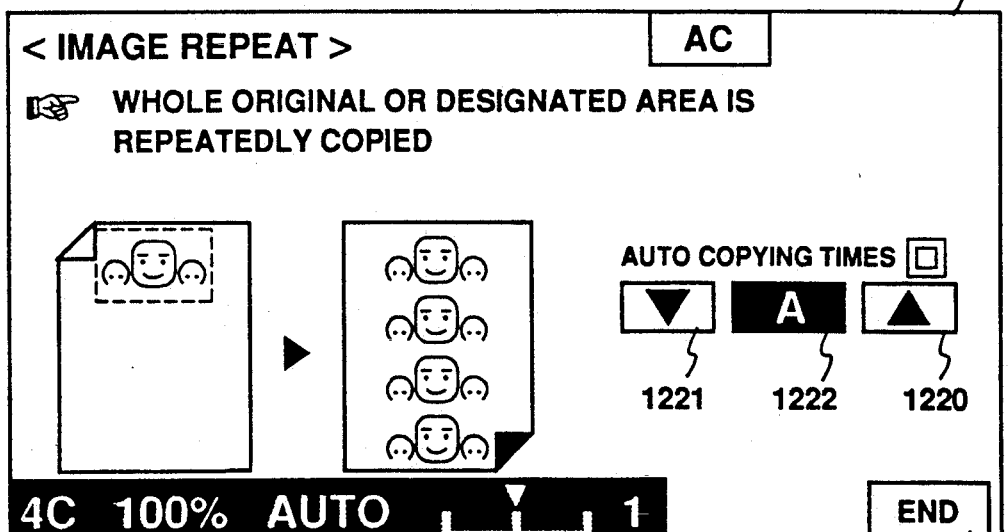
FIG. 14B is a diagram of a displaying state of the liquid crystal touch panel 1203 when an image repeat function in accordance with the second embodiment is used.

FIG. 14B is a diagram of a displaying state of the liquid crystal touch panel when the image repeat function in accordance with the second embodiment is used.

To designate the image repeat function, the image repeat key 1205 is first pressed. When the image repeat key 1205 is pressed, the liquid crystal touch panel 1203 displays as shown in FIG. 14B. The number of images to be repeatedly formed is designated by being increased with an up key 1220 or by being reduced with a down key 1221 or is automatically designated by an automatic key 1222. When the setting is completed, an end key 1223 is finally pressed to confirm the completion of the setting.

In the second embodiment, there are a pattern addition mode for adding to a copying output (copy) a hard-to-see patten to identify the copying machine used or a person who has operated the copying machine, and a pattern addition inhibition mode for inhibition addition of the pattern.

In the second embodiment, when the power source is turned on, the pattern addition mode is selected. Ordinarily, copies are made always in this mode. If necessary, the pattern addition inhibition mode can be designated by using the ten key cluster 1201 and the asterisk key 1202. For example, if the operator successively inputs

[*][2][0][4][2][9][*], the pattern addition inhibition mode is selected. This key input order is not released to general users; it is released to servicemen or particular operators. In the pattern addition inhibition mode, while the pattern for identifying the copying machine or the operator is not added to the copying output (copy), the following restrictions upon use or measures are effected.

(1) In the pattern addition inhibition mode, the number of copies is limited to one to prevent a large number of copies of an original which should not be copied from being made and abused.

(2) In the pattern addition inhibition mode, the image repeat function is inhibited to a large number of copies of an original which should not be copied from being made and abused, as in the case (1).

(3) Simultaneously with the completion of copying in the pattern addition inhibition mode, the copying machine is reset in the pattern addition mode. That is, the machine is prevented from being left in the pattern addition inhibition mode so that a large number of copies of an original which should not be copied can be made and abused by unspecified users.

(4) In the pattern addition inhibition mode, the date of use of the copying machine is stored in the copying machine. Further, in the case of a copying machine requiring inserting an identification card into the machine or inputting an operator's identification number to identify the operator, an operator's identification number or the like is stored in a nonvolatile memory in the machine. That is, if copies are abused, all information stored in the machine is examined to limit suspected operators to some extent.

Third Embodiment

The third embodiment will be described below.

The construction of the third embodiment is the same as the first embodiment except that construction of the image scanner unit is different from that of the first embodiment. The other units are therefore unillustrated and the description for them will not be repeated.

FIG. 16 is a block diagram of the construction of the image scanner in accordance with the third embodiment. Components of this embodiment corresponding or identical to those shown in FIG. 1 are indicated by the same reference characters and the description for them will not be repeated.

In FIG. 16, a block 2411 represents a pattern generation circuit, a block 2413 an I/O port, a block 2414 a CPU, a block 2415 a ROM, a block 2416 a RAM, and a block 2410 an AND gate.

The operation of this unit will be described below. A logical AND of an 8-bit output V from the density conversion circuit 408 and determination signal H output from the determination circuit 409 is obtained to be output as V'. Consequently, when determination signal $H=1$, that is, it is determined that a particular kind of original is being read, the pattern generation circuit 2411 described later becomes through and output $V'=FF(255)$ irrespective of the value of input signal V. When determination signal $H=0$, that is, it is determined that no particular kind of original is being read, the pattern generation circuit 2411 described later becomes through and the value of input signal V is directly output as output signal V'. When determination signal $H=2$, that is, there is a probability of a particular kind of original being read, the pattern generation circuit described later generates a particular 2-bit pattern signal which is supplied to the AND gate 2410 together with determination signal H. The pattern signal and input signal V are thereby combined to form output signal V'.

Figure 17A:
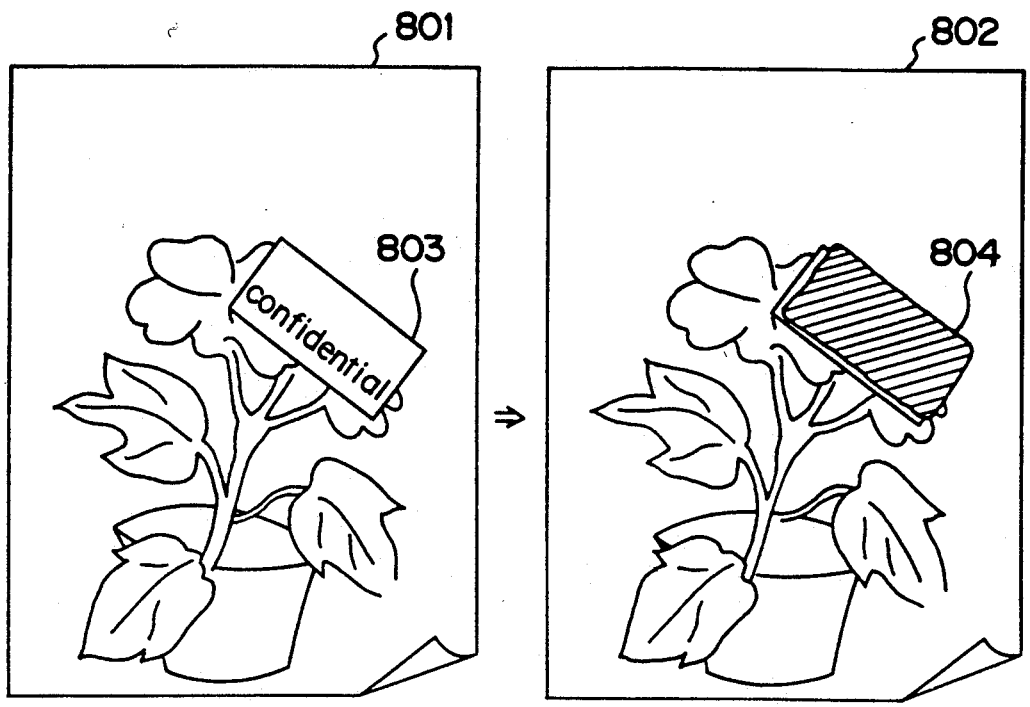
FIGS. 17A and 17B are diagrams of results of processing using a pattern generation circuit 2411 of the third embodiment.
Figure 17B:
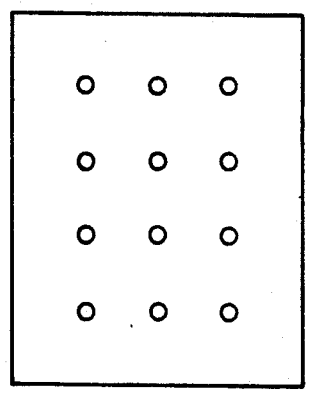

FIGS. 17A and 17B are diagrams showing results of processing of the pattern generation circuit 2441 in accordance with the third embodiment.

FIG. 17A shows a processing result in a case where a particular kind of original is read. An original 801 includes a particular image 803, i.e., the particular kind of original. When the copying machine is read by the copying machine in response to a copying instruction, an output image 802 is obtained. In the output image 802, a particular region 804 corresponding to the position of the particular image 803 is masked. That is, the particular region 804 is painted out, for example, by magenta (M) if $CNO=0$, by cyan (C) if $CNO=1$, or by yellow (Y) if $CNO=2$. Consequently, the particular region 804 is not normally copied and the particular original image 803 is not reproduced in a recognizable state.

FIG. 17B shows a case of reading a particular image. In this case, output signal $H=2$ from the determination circuit 409 is output and the pattern generation circuit 2411 generates a signal representing a certain pattern to be output. For example, as shown in FIG. 17B, information including the model number of the machine and/or the date of use of the machine is printed as this pattern at certain intervals over the copy. The pattern is printed in yellow, so that even if such information is printed by erroneous determination while no particular image is included in the original, the deterioration in image quality cannot be recognized by the user and there is no serious problem in using the output image. If an output hard copy is printed from a particular kind of original and is put to the same use as the original, the machine used to obtain this copy can be identified from the pattern printed in yellow.

"Particular kind of original" referred to herein denotes an original such as a bank note or bill copied alone or a combination of a bank note or bill with other originals. The present invention is applicable no matter what the concept of "particular kind of original". For example, the image 803 may be a particular kind of original while the image 801 is a particular kind of original in the example shown in FIG. 17A.

Fourth Embodiment

In the above-described first to third embodiments, the method of discriminating particular kinds of original is applied to the image scanner unit. However, the present invention is not limited to this, and an independent image processing unit may be arranged to discriminate particular kinds of original.

Figure 18:
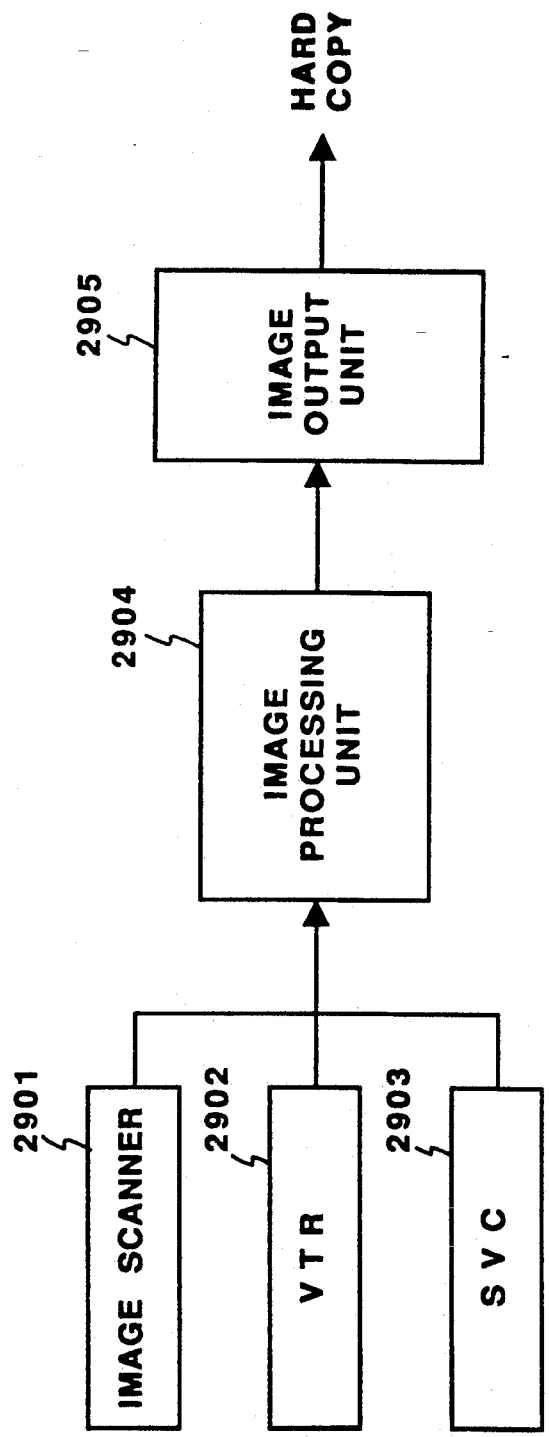
FIG. 18 is a diagram of the construction of a system in accordance with a fourth embodiment of the present invention.

FIG. 18 is a diagram of the construction of an image processing system in accordance with the fourth embodiment. A block 2901 represents an image scanner, a block 2092 a video tape recorder (VTR), a block 2903 a still video camera (SVC), a block 2904 an image processing unit having a particular original discrimination function in accordance with this embodiment and having a frame memory, and a block 2905 an image output unit such as a facsimile apparatus or a printer. The image scanner 2901, the VTR 2902 and SVC 2903 are shown as examples of input units of this embodiment but these are not exclusive and a host computer or the like may also be connected.

The construction of the image processing unit 2904 will be described below. The image processing unit 2904 is provided with the determination circuit 409 and the pattern generation circuit 2411 described above with respect to the third embodiment to have a particular original discrimination function. The operation of particular original discrimination is the same as that in accordance with the third embodiment and details of it will not be repeated.

The operation of the image processing unit 2094 will be described below. When an image signal is supplied from the image scanner 2901, the VTR 2902 or the SVC 2903 to the image processing unit 2094, the operation of discriminating particular kinds of original is successively performed by using the frame memory and discrimination results are output to the image output unit 2905.

Thus, the image processing unit for discriminating particular kinds of originals is independently provided to prevent, for example, a communication system from communicating by using particular kinds of original or outputting such originals.

In the fourth embodiment, the image output unit 2905 may be provided with a determination circuit and a patten generation circuit to enable discrimination according to print signals Y, M, C and BK or Y, M and C, or R, G and B and to output images according to discrimination results, i.e., to enable discrimination with respect to any input as well as to reduce deteriorations in image quality when a determination error occurs.

In the fourth embodiment, the determination signal signal H is a 3-bit signal of 0 to 2. However, it is also possible to increase the number of bits to change the density of an added pattern (add-on information) according to the discrimination rate, i.e., the probability of the existence of a particular kind of original.

Fifth Embodiment

According to the above mentioned method, a memory function for storing a particular pattern and a composition function for combining this particular pattern with an output image are added and copying is performed by combining an output image and a particular pattern having a color tone and a density such as to be inconspicuous with human eyes. It is thereby possible to recognize that the reproduced image is not an original but a copy.

However, this method is unsatisfactory in terms of security for prevention of forgery, because the composition function for combining a particular pattern to an output image may be removed from the copying machine or the memory function for storing a particular pattern may be replaced with a memory function storing no such particular pattern to output an image without combining a particular pattern therewith, so that it is impossible to identify the reproduced image as an original or a copy. This embodiment solves this problem.

Figure 20:
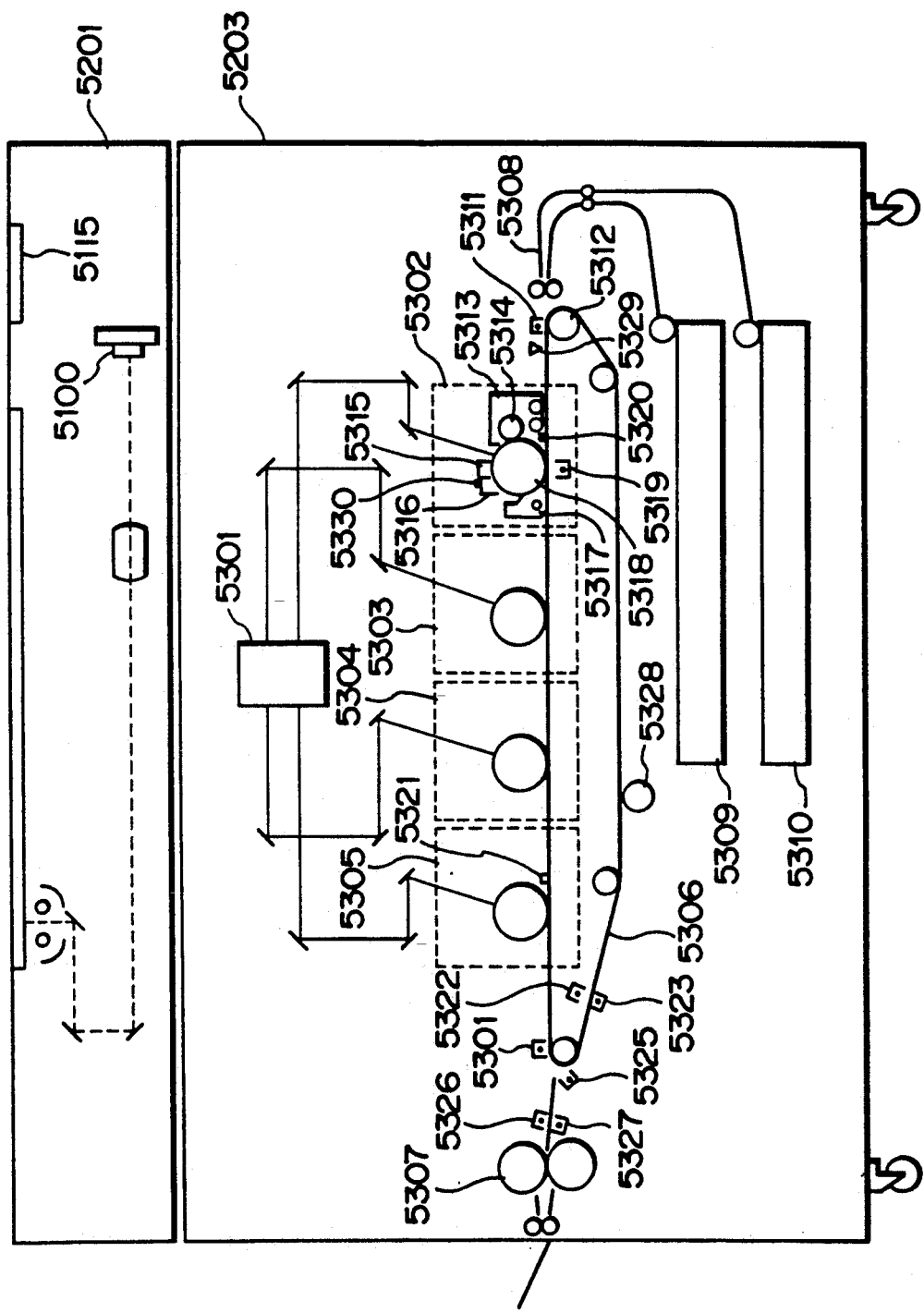
FIG. 20 is a sectional side view of the construction of a digital color copying machine in accordance with the fifth embodiment of the present invention.

FIG. 20 is a sectional side view of the construction of a digital color copying machine in accordance with a fifth embodiment of the present invention. The whole machine illustrated is generally composed of a reader unit 5201 and a printer unit 5203.

Construction of Reader Unit

Figure 19:
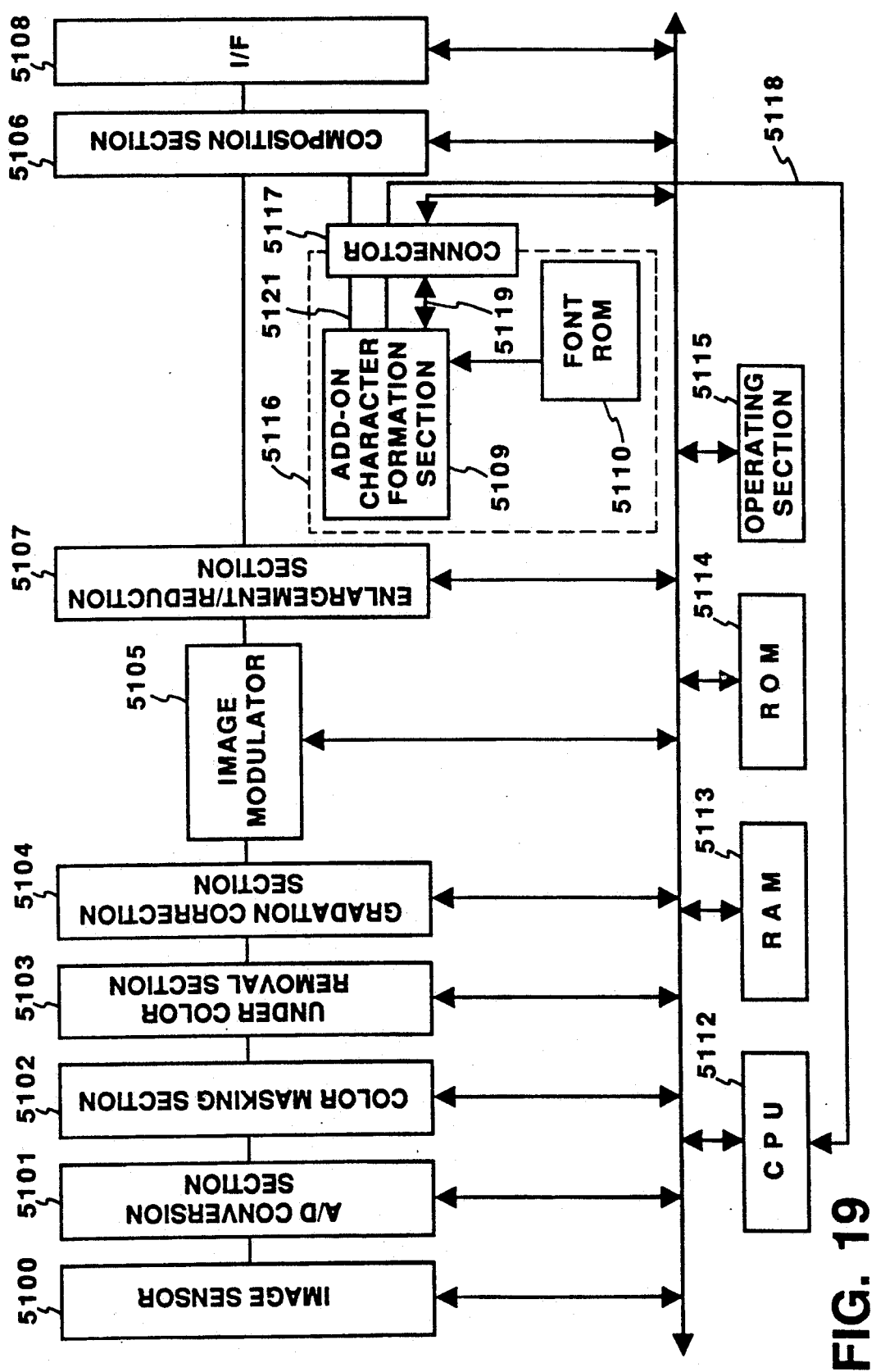
FIG. 19 is a block diagram of the construction of a reader unit 201 in accordance with a fifth embodiment of the present invention.

FIG. 19 is a block diagram of the construction of the reader unit 5201 shown in FIG. 20. In FIG. 19, a block 5100 represents an image sensor which is constituted of a CCD or the like and which converts read image information into an electrical signal to output an analog image signal to an A/D conversion section 5101. The A/D conversion section 5101 converts the analog signal into binary data, i.e., a digital image signal, for example, with a predetermined threshold value and outputs the digital image signal to a color masking section 5102. An under color removal section 5103 removes gray components from the three-color signal to substitute a black signal. A gradation correction section 5104 executes gradation processing (gamma-, brightness- contrast-, and density-conversion and the like). An image modulator 5105 incorporates an unillustrated area generation circuit and executes various kinds of image processing by this circuit. An enlargement/reduction section 5107 effects magnification changing processing.

An add-on board 5116 is connected to the body of the copying machine by a connector 5117. An image bus 5121, a signal line 5118 and a CPU bus 5120 are provided on the add-on board. The CPU bus 5120 is connected through the connector 5117. The signal line 5118 is always maintained in an active state by an add-on character formation section 5109 and is made positive when the add-on board 5116 is disconnected. The add-on character formation section 5109 generates an image signal based on a pattern stored in a font ROM 5110. This pattern is used as a code indicating that an output image is not an original image but a copy image.

An image composition section 5106 combines the image signal from the original and the image signal from the add-on character formation section 5109. This composition is effected in such a manner that the image from the add-on character formation section 5109 is output with a certain density and color tone. A pattern having a color tone and a density such as to be positively read with a CCD or the like while being inconspicuous with human eyes is thereby selected and an effective forgery prevention function is thereby achieved.

An interface 5108 interfaces with the image forming unit, i.e., the printer and functions to effect communication with the printer unit 5203, for example, by a serial communication section as well as to transmit the image signal. A system bus 5111 connects a CPU 5112, a ROM 5114 and a RAM 5113 to to transmit signals relating to the operation of this unit. The CPU 5112 operates for overall control of the unit. In the ROM 5114, a program for operating the CPU 5112 is stored. The RAM 5113 is used as a work area for the CPU 5112 which performs control operations based on the program in the ROM 5114.

An operating section 5115 has keys and switches for setting copying conditions with respect to an image read with the image sensor 5110 by combining copying modes (conditions relating to the density, the number of copies and the magnification) and has a display.

Construction of Printer 5203

Referring to FIG. 20, the printer 5203 has a polygon scanner 5301 for scanning a surface of a sensitive drum with laser light, an initial-stage image formation section for forming an image in magenta, and cyan, yellow and black image formation sections 5303, 5304, and 5305 having the same construction of the image formation section 5302.

The image forming unit 5302 also has a sensitive drum 5318 on which a latent image is formed by exposure to laser light, and a development device 5113 for effecting toner development on the drum 5318. In the development device 5313 are provided sleeve 5314 for applying a development bias to effect toner development, a primary charger 5315 for charging the sensitive drum 5318 to a desired potential, a cleaner 5316 for cleaning the surface of the drum 5318 after transfer, an auxiliary charger 5316 for charging the surface of the drum 5318 cleaned by the cleaner 5317 to enable suitable charging at the primary charger 5315, a pre-exposure lamp 5330 for erasing residual charge on the drum 5318, and a transfer charger 5319 for effecting discharging on the back side of a transfer belt 5306 to transfer a toner image on the drum 5318 to a transfer sheet.

Transfer sheets are accommodated in cassettes 5309 and 5310. An attraction charger 5308 enables a transfer sheet from the cassette 5309 or 5310 to be attracted to the transfer belt 5306. A transfer belt roller 5312 is used to rotate the transfer belt 5306 and to effect attraction charging on the transfer belt 5306.

A charge removing charger 5324 enables the transfer sheet to be easily separated from the transfer belt 5306. A separation charger 5325 serves to prevent an image disturbance due to separation discharge when the transfer sheet is separated from the transfer belt. Pre-fixation chargers 5326 and 5327 serve to reinforce adhesion of toner to the transfer sheet after the separation to prevent occurrence of an image disturbance. Transfer belt charge removing chargers 5322 and 5323 remove charge from the transfer belt 5306 to electrostatically initialize the transfer belt 5306. A belt cleaner 5306 serves to remove contaminations on the transfer belt 5306.

A sheet end sensor 5329 detects and end of the transfer sheet supplied onto the transfer belt from a paper feed section 5308. A detection signal from the sheet end sensor 5329 is transmitted from the printer unit to the reader unit to be used as a sub scanning sync signal when a video signal is transmitted from the reader unit to the printer unit.

Copying Operation

A procedure of attaching the add-on board 5116 to the main body of the copying machine and using a forgery prevention function in an add-on mode will be described below.

Figure 23:
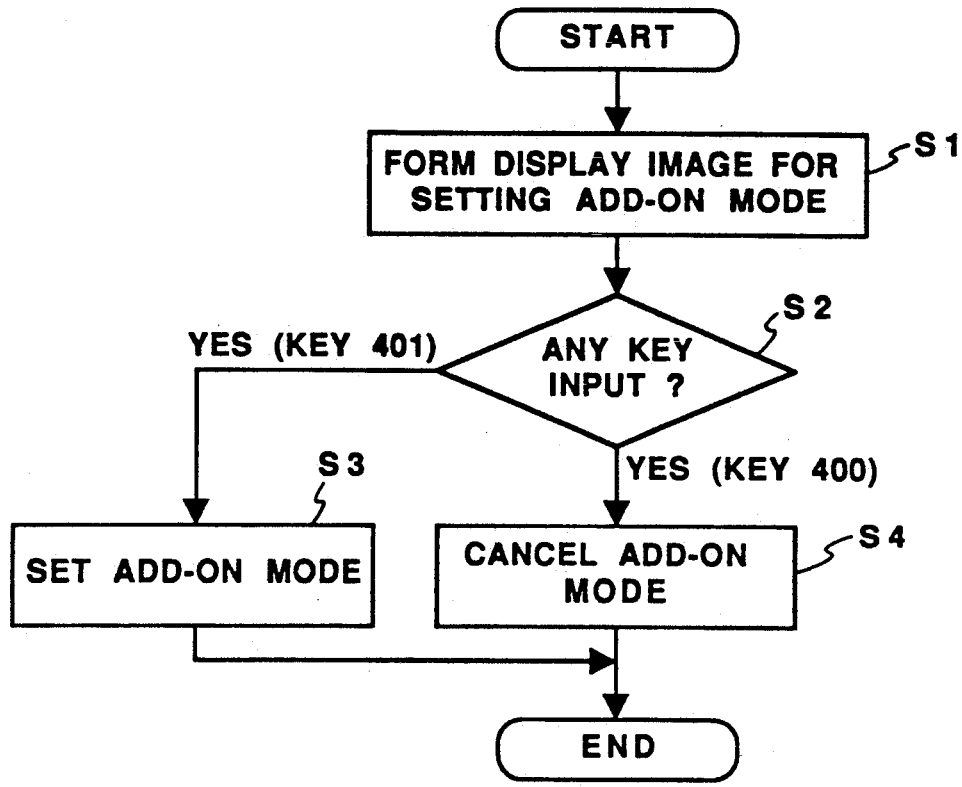
FIG. 23 is a flowchart of the operation of setting the add-on mode in accordance with the fifth embodiment.
Figure 24:
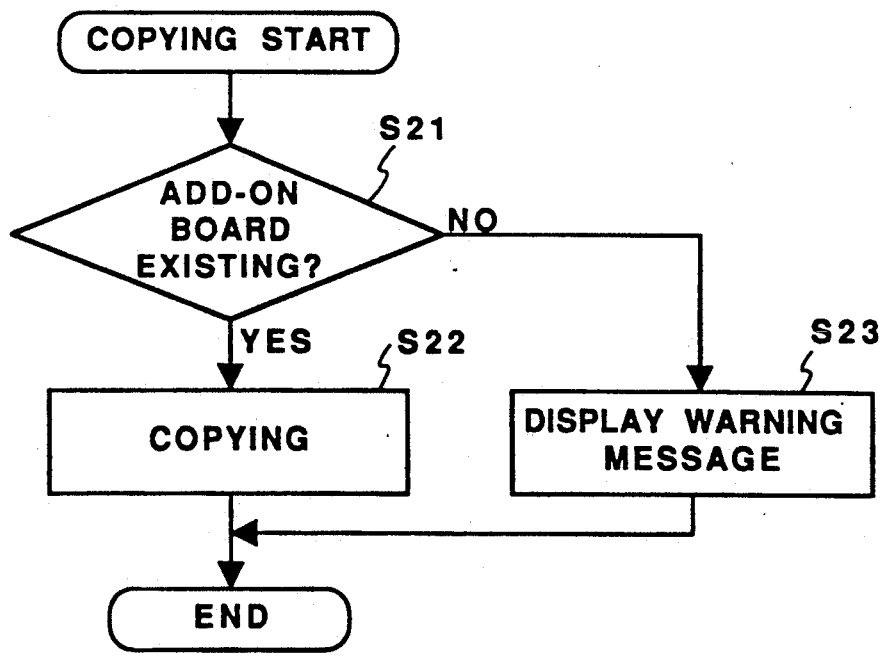
FIG. 24 is a flowchart of the copying operation in accordance with the fifth embodiment.

FIGS. 21 and 22 are diagrams of the operation in the add-on mode in accordance with the fifth embodiment. FIG. 23 is a flowchart of the operation of setting the add-on mode in accordance with the fifth embodiment, and FIG. 24 is a flow chart of the copying operation in accordance with the fifth embodiment.

Referring to FIG. 23, an image for setting the add-on mode which is a service mode (option) is shown on the display (not shown) of the operating section 5115, as illustrated in FIG. 21 (step S1). In the fifth embodiment, the display is a touch panel. The operator presses a key 5401 which is one of icons in the displayed image to set the add-on mode (step S2), or presses a key 5400 in the icons to cancel (does not set) the add-on mode (step S3), thereby designating addition/non-addition of the forgery prevention function.

Only a person who maintains the copying machine, i.e., a serviceman or the like is allowed to effect the above-described processing, and general users cannot operate the machine in this manner. The maintenance man cancels the add-on mode, for example, for maintenance operation, checks malfunctions or the like of the machine, and resets the add-on mode after the completion of checking.

To start user's copying operation, an ordinary copying key (not shown) of the operating section 5115 is pressed. If the add-on mode has been set, the signal line 5118 is checked. If the line is active (step S21), the add-on board 5116 is in the attached state and the copying operation is immediately started (step S22). If the signal line 5118 is positive, that is, the add-on board is not attached (step S21), the copying operation is not executed and a warning message such as that shown in FIG. 22 is shown by the display (step S23). Needless to say, when the add-on mode is not set, a maintenance operation or the like is performed by a maintenance man and the ordinary copying operation can be performed. That is, during the copying operation, the signal line 5118 is not checked.

Thus, the fifth embodiment of the present invention is characterized in controlling the machine so that the machine is automatically disabled from copying when the forgery prevention function is removed by the user.

In accordance with the fifth embodiment, as described above, a circuit for preventing forgery can easily be added and, once the forgery prevention function is added, the machine is automatically disabled from copying if an act of disconnecting this circuit, i.e., removing the forgery prevention function other than after service operations is performed, thereby ensuring security against forgery.

Sixth Embodiment

Figure 25:
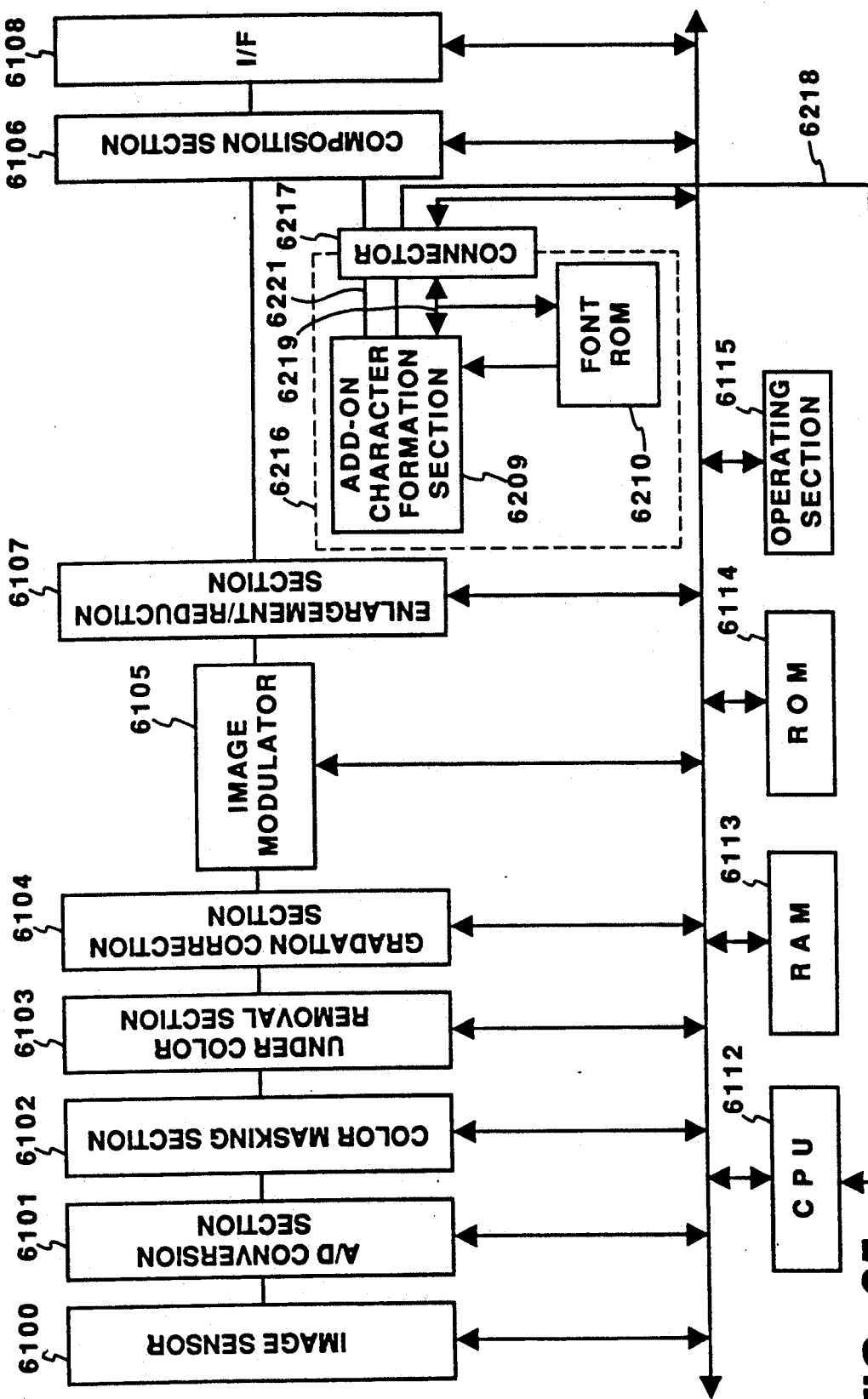
FIG. 25 is a block diagram of a reader unit in accordance with a sixth embodiment of the present invention.
Figure 26:
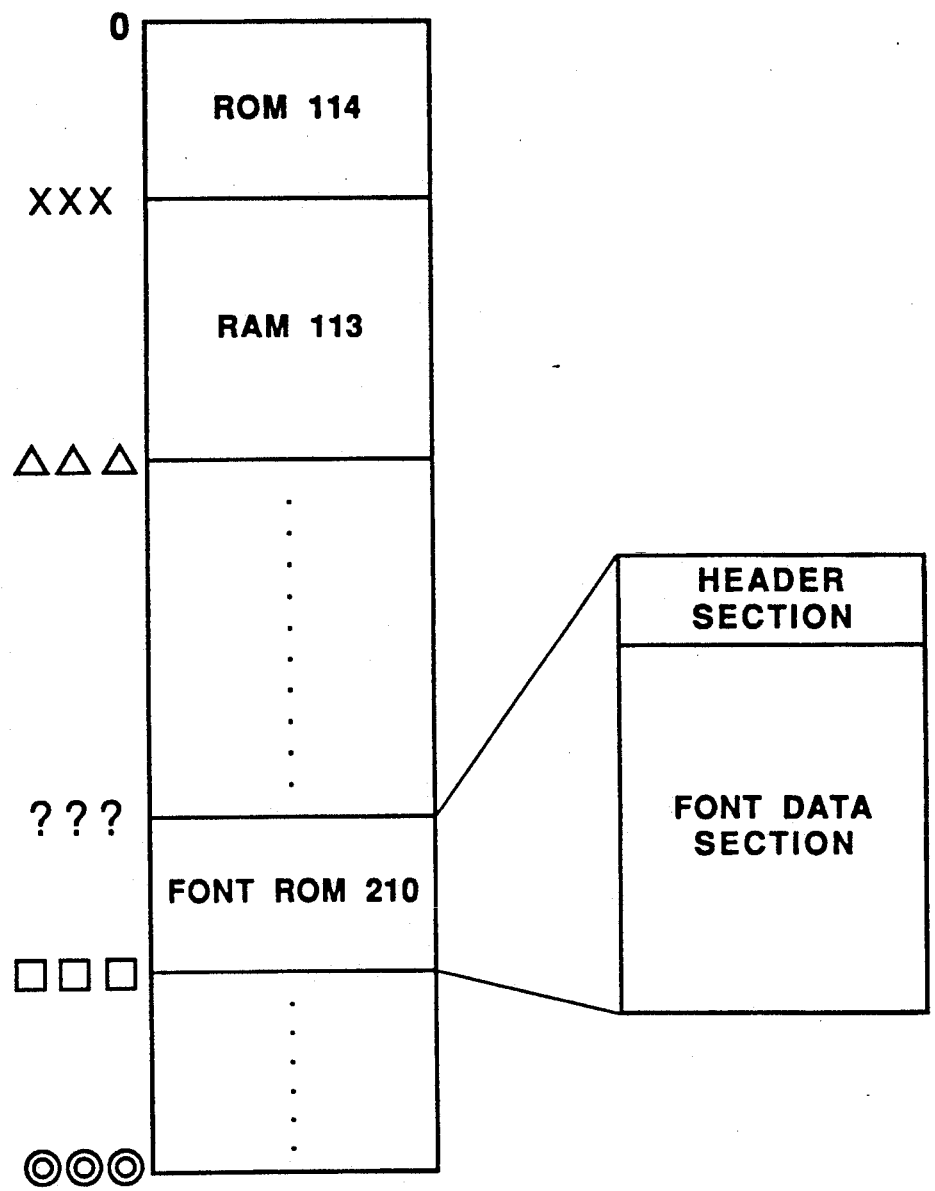
FIG. 26 is a diagram of a memory map under the control of a CPU for controlling the reader unit in the sixth embodiment.

FIG. 25 is a block diagram of the construction of a reader unit in accordance with the sixth embodiment, and FIG. 26 is a diagram of a memory map under the control of a CPU which controls the reader unit in accordance with the sixth embodiment. This embodiment has the same construction as that shown in FIG. 19 except for the add-on board. The same functions and construction as those of the unit shown in FIG. 19 will no be described and only specific features of the sixth embodiment will be described below.

Referring to FIG. 25, an add-on board 6216 of the sixth embodiment is connected to the body of the copying machine by a connector 6217. An image bus 6221 and a signal line 6218 are provided on the add-on board. The signal line 6218 is always maintained in an active state by an add-on character formation section 6209 and is made positive when the add-on board 6216 is disconnected. The add-on character formation section 6209 generates an image signal based on a pattern stored in a font ROM 6210. This pattern is used as a code indicating that an output image is not an original image but a copy image.

The font ROM 6210 storing the pattern in the add-on board is also connected to a CPU bus 6220, so that a CPU 6112 can directly read the content of the font ROM 6210. As shown in the memory map of FIG. 26, the font ROM 6210 is divided into a header section for storing header information such as serial numbers and a font data section for storing font data.

Figure 27:
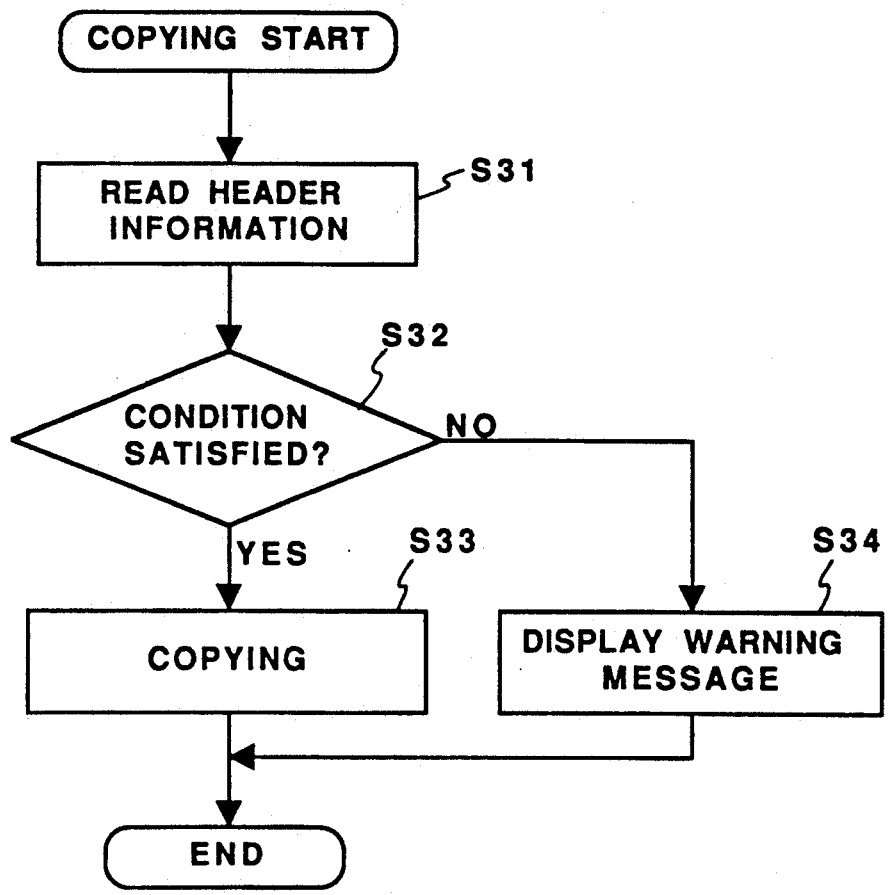
FIG. 27 is a flowchart of the copying operation in accordance with the sixth embodiment.

FIG. 27 is a flow chart of the copying operation in accordance with the sixth embodiment.

In the add-on mode, when a copy key (not shown) of the operating section 6115 is pressed, header information stored in the font ROM 6210 is read out (step S31). If a predetermined condition is satisfied (step S32), the copying operation is immediately started (step S33). If the condition is not satisfied, a warning message, such as that mentioned above with respect to the fifth embodiment and shown in FIG. 22, is displayed on the display (not shown), and the process is terminated without performing the copying operation (step S34).

Thus, in the sixth embodiment, a certain condition related to header information is imposed as a means for coping with a situation where the header information is changed, for example, by interchange of the add-on board, and the copying machine is controlled so as to be capable of copying only when the condition is satisfied. This embodiment is thus arranged by considering a situation enabling forgery, which cannot simply determined from the attachment state of the add-on board.

In the above-described fifth and sixth embodiments, a condition related to the attachment state of the add-on board and condition adaptation of heater information are respectively used as conditions for the copying operation. Copying may be allowed on condition that both these two conditions are satisfied.

Seventh Embodiment

Although means for adding a particular pattern as described above have also been used for black-and-white copying, it is useless to add a particular pattern to a black-and-white copy since all particular originals which should not be copied are chromatic, and the quality of the reproduced image is deteriorated if a particular pattern is added.

The seventh embodiment of the present invention will be described below.

A copying machine in accordance with the seventh embodiment has a construction in which a circuit for determination as to whether a read image is achromatic or chromatic is annexed to the image scanner unit described above as a unit of the first or third embodiment.

FIG. 28 is a block diagram of the construction of the image scanner unit in accordance with the seventh embodiment. In FIG. 28, circuit blocks having the same functions as those shown in FIG. 1 are indicated by the same reference characters and they will not specifically be described. As particularly different circuits, there are a CPU 7414, a ROM 7415, a RAM 7416, a pattern addition circuit 7410, and an achromatic/chromatic color discrimination circuit 7417 provided between the density conversion circuit 408 and the pattern addition circuit 410.

The achromatic/chromatic color discrimination circuit 7417 determines a read image to be copied as a chromatic or achromatic (black-and-white) image. If it determines that the read image is chromatic, it makes the pattern addition circuit 410 execute pattern addition. If it determines that the read image is achromatic, it inhibits the pattern addition circuit 410 from executing pattern addition.

This determination result is sent to the pattern addition circuit 7410 as a 1-bit determination signal CH. CH=0 if the read image is determined as an achromatic image, and CH=1 if the read image is determined as a chromatic image.

The pattern addition circuit 7410 in accordance with this embodiment will be described below.

Figure 29:
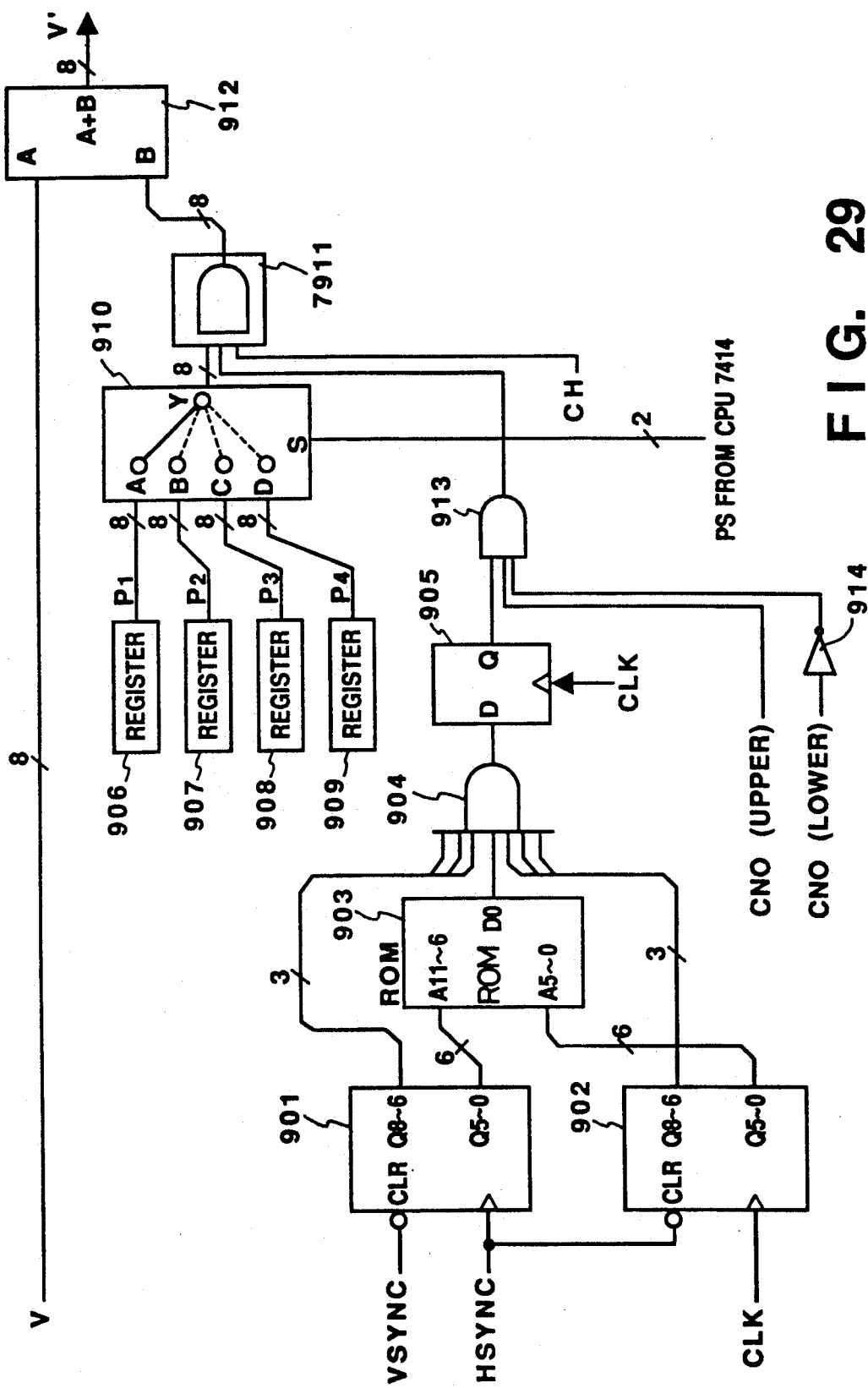
FIG. 29 is a block diagram of the construction of a pattern addition circuit 7410 of the seventh embodiment.

FIG. 29 is a block diagram of the construction of the pattern addition circuit 7410 in accordance with the seventh embodiment.

In FIG. 29, circuit blocks having the same functions as those shown in FIG. 9 (first embodiment) are indicated by the same reference characters and they will not specifically be described. In this embodiment, an AND gate 7911 which processes the determination signal CH received from the achromatic/chromatic color discrimination circuit 7417 always outputs 0 when CH=0. At this time, the image signal V is output as image signal V' while no particular pattern is added from an adder 912 to the image signal V.

Thus, the seventh embodiment satisfies a requirement that no particular pattern should be added to an image reproduced as a black and white copy. Thus, image reproduction is effected without adding a pattern in the pattern addition circuit 7410 to prevent any deterioration in image quality.

Eighth Embodiment

In the above-described seventh embodiment, pattern addition/non-addition is controlled based on R, G, and B signals read with the reader of the copying machine. However, the present invention is not limited to this, and the arrangement may be such that, with respect to image data (R, G, and B signals) obtained from an external unit, e.g., a host computer, determination is also be made as to achromaticity or chromaticity in the same manner as the seventh embodiment, and pattern addition in the pattern addition circuit is inhibited for black-and-white copying if a read image is recognized as achromatic.

FIG. 30 is a diagram of an image processing system in accordance with the eighth embodiment of the present invention. As shown in FIG. 30, the image processing system includes an external unit 8001, e.g., a host computer, an image scanner 8003, a printer 8004, and a relay unit 8002. The relay unit 8002 relays the external unit 8001 and the printer 8004 (image scanner 8003) and has the same components as the determination circuit 409, the achromatic/chromatic color discrimination circuit 7417, the pattern addition circuit 7410, the I/0 port 413, the CPU 7414, the ROM 7415 and the RAM 7416.

The operation of this system will be described below.

When the relay unit 8002 receives an image signal from the external unit 8001, it examines the ratio of R/G/B components and determines that the received image signal represents a black-and-white signal if the ratio of 1:1:1. In this case, the signal is sent to the printer 8004 without adding a pattern by the pattern addition circuit.

In each of the embodiments 7 and 8, pattern addition is inhibited only when a black-and-white copy is supplied. However, the copying machine may be controlled in such a manner that addition of a particular pattern is also inhibited when a monochromatic copy mode or a two-color copy mode is designated with respect to an original.

The present invention may be applied to a system constituted of a plurality of units or to an apparatus constituted on one unit. Needless to say, the present invention can also be applied by supplying a system or an apparatus with a program for achieving the same effect of the invention.

With respect to the above-described embodiments, laser beam printers have been illustrated but the present invention is not limited to them. The present invention is applicable to ink jet printers, thermal transfer printers and the like. Specifically, the present invention may be applied to a bubble-jet printer using a type of head which jets liquid droplets by utilizing film boiling caused by thermal energy.

The color of the added pattern in accordance with the present invention is not limited to yellow selected in the above-described embodiments; it may be selected from other colors, e.g., quiet colors such as yellowish green and gray, and high-value colors such as light violet and light green.

The means for inputting an original image in accordance with the present invention is not limited to the reader used in the above-described embodiments; it may be a means using a still video camera or a video camera or a means for inputting an image formed by a computer graphic system.

Needless to say, the present invention also comprises a combination of two or more of the above-described embodiments.

The present invention is not limited to the above-described embodiments and can be variously modified within the scope set forth in the appended claims.

What is claimed is:

1. An image processing apparatus comprising:
   input means for inputting image data;
   processing means for processing the image data input by said input means and for outputting a reproduction data for reproducing the image represented by the image data;
   addition means for adding information for identifying the apparatus, with which the image data is processed, to the image represented by the reproduction data,
   wherein the information is added so as to be difficult to discriminate with human eyes, and wherein the information relates to the apparatus identification data given by a supplier who supplies the apparatus.

2. An apparatus according to claim 1, wherein said addition means includes a memory for storing the apparatus identification data, and wherein the memory is accessed in synchronism with image processing by said processing means.

3. An apparatus according to claim 1, wherein the information is repeatedly added to reproduction data corresponding to a single image.

4. An apparatus according to claim 1, wherein the information is added with yellow pattern.

5. An image processing apparatus comprising:
   input means for inputting image data;
   processing means for processing the image data input by said input means and for outputting a reproduction data for reproducing the image represented by the image data;
   addition means for adding information for identifying the apparatus, with which the image data is processed, to the image represented by the reproduction data,
   wherein the information is added so as to be difficult to discriminate with human eyes, and wherein the information relates to manufacturer's serial number of the apparatus with which the image data is processed.

6. An apparatus according to claim 5, wherein said addition means includes a memory for storing the apparatus serial number and wherein the memory is accessed in synchronism with image processing by said processing means.

7. An apparatus according to claim 5, wherein the information is repeatedly added to reproduction data corresponding to a single image.

8. An apparatus according to claim 5, wherein the information is added with yellow pattern.

9. An image processing method comprising:
   an input step of inputting image data;
   a processing step of processing the image data input in said input step and outputting a reproduction data for reproducing the image represented by the image data;
   an addition step of adding information for identifying the apparatus, with which the image data is processed, to the image represented by the reproduction data,
   wherein the information is added so as to be difficult to discriminate with human eyes, and wherein the information relates to the apparatus identification data given by a supplier who supplies the apparatus.

10. A method according to claim 9, wherein said addition step includes the step of accessing a memory which stores the apparatus identification data in synchronism with image processing in said processing step.

11. A method according to claim 9, wherein the information relates to manufacturer's serial number of the apparatus with which the image data is processed.

12. A method according to claim 9, wherein the information is repeatedly added to reproduction data corresponding to a single image.

13. A method according to claim 9, wherein the information is added with yellow pattern.

14. An image processing apparatus comprising:
   input means for inputting a plurality of color component signals; and
   processing means for processing the plurality of color component signals and for outputting a plurality of processed color signals,
   wherein said processing means synthesizes information relating to the apparatus, with which the plurality of color component signals are processed, with at least one of the plurality of processed color signals, and wherein the information is synthesized so as to be difficult to discriminate with human eyes.

15. An apparatus according to claim 14, wherein the information is repeatedly added to reproduction data corresponding to a single image.

16. An apparatus according to claim 14, wherein the information is added with yellow pattern.

17. An image processing apparatus comprising:
   input means for inputting a plurality of color component signals; and processing means for processing the plurality of color component signals and for outputting a plurality of frame-sequential color signals, wherein said processing means synthesizes information relating to the apparatus, with which the plurality of color component signals are processed, with at least one of the plurality of frame-sequential color signals, and wherein the information relates to manufacturer's serial number of the apparatus with which the image data is processed.

18. An apparatus according to claim 17, further comprising a memory for storing the apparatus serial number and wherein the memory is accessed in synchronism with signal processing by said processing means.

19. An apparatus according to claim 17, wherein the information is repeatedly added to frame-sequential color signals corresponding to a single image.

20. An apparatus according to claim 17, wherein the information is added with yellow pattern.

21. An image processing method comprising:

an input step of inputting a plurality of color component signals; and a processing step of processing the plurality of color component signals and outputting a plurality of processed color signals, wherein said processing step includes the steps of synthesizing information relating to the apparatus, with which the plurality of color component signals are processed, with at least one of the plurality of processed color signals, and synthesizing the information so as to be difficult to discriminate the information with human eyes.

22. A method according to claim 21, wherein the information relates to manufacturer's serial number of the apparatus with which the image data is processed.

23. A method according to claim 21, wherein the information is repeatedly added to processed color signals corresponding to a single image.

24. A method according to claim 21, wherein the information is added with yellow pattern.

* * * * *

UNITED STATES PATENT AND TRADEMARK OFFICE
CERTIFICATE OF CORRECTION

PATENT NO. : 5,257,119

DATED : October 26, 1993

INVENTOR(S) : MASAHIRO FUNADA, ET AL.

Page 1 of 3

It is certified that error appears in the above-identified patent and that said Letters Patent is hereby corrected as shown below:

Title page,
IN [56] REFERENCES CITED

Under U.S. PATENT DOCUMENTS:
"4,870,506   9/1989   Miura" should read
--4,870,503   9/1989   Miura--.

Under FOREIGN PATENT DOCUMENTS:
"382549   8/1990      ." should read
--382549   8/1990   European Pat. Off.--.

COLUMN 1

Line 67, "according" should read --according to--.

COLUMN 3

Line 54, "components" should read --component--.

COLUMN 5

Line 46, "is" should read --is a--.
Line 61, "and" should read --an--.

COLUMN 6

Line 41, "T," should read --Y,--.

COLUMN 7

Line 9, "$yi=(\alpha/255) \cdot yi-1^{+\beta} \cdot x_{i-1}$   (1)" should read
--$yi=(\alpha/255) \cdot y_{i-1}+\beta \cdot x_{i-1}$   (1)--.

UNITED STATES PATENT AND TRADEMARK OFFICE
CERTIFICATE OF CORRECTION

PATENT NO. : 5,257,119
DATED : October 26, 1993
INVENTOR(S) : MASAHIRO FUNADA, ET AL.

It is certified that error appears in the above-identified patent and that said Letters Patent is hereby corrected as shown below:

COLUMN 8

Line 65, "correspond" should read --corresponds--.

COLUMN 10

Line 35, "key 1201" should read --key 1202--.

COLUMN 12

Line 32, "copying machine" should read --original--.

COLUMN 14

Line 65, "to to" should read --to--.

COLUMN 15

Line 25, "cleaner 5316" should read --cleaner 5317--.
Line 40, "charger 5324" should read --charger 5323--.
Line 53, "and" should read --an--.

COLUMN 16

Line 59, "no" should read --not--.

COLUMN 17

Line 31, "simply" should read --simply be--.

UNITED STATES PATENT AND TRADEMARK OFFICE
CERTIFICATE OF CORRECTION

PATENT NO. : 5,257,119
DATED : October 26, 1993
INVENTOR(S) : MASAHIRO FUNADA, ET AL.

It is certified that error appears in the above-identified patent and that said Letters Patent is hereby corrected as shown below:

COLUMN 18

Line 62, "of" should read --is--.

COLUMN 19

Line 42, "data;" should read --data; and--.
Line 68, "data;" should read --data; and--.

COLUMN 20

Line 25, "data;" should read --data; and--.

Signed and Sealed this

Nineteenth Day of July, 1994

Attest:

BRUCE LEHMAN

Attesting Officer        Commissioner of Patents and Trademarks